US006942726B2

(12) United States Patent
Cook et al.

(10) Patent No.: US 6,942,726 B2
(45) Date of Patent: Sep. 13, 2005

(54) CEMENTITIOUS MATERIAL REINFORCED WITH CHEMICALLY TREATED CELLULOSE FIBER

(75) Inventors: Jeffery Todd Cook, Germantown, TN (US); Howard Leon Schoggen, Southaven, MS (US); Robert Irvin Bell, Collierville, TN (US); David Jay Smith, Germantown, TN (US); Gerald Hunt Morton, Germantown, TN (US)

(73) Assignee: BKI Holding Corporation, Wilmington, DE (US)

( * ) Notice: Subject to any disclaimer, the term of this patent is extended or adjusted under 35 U.S.C. 154(b) by 0 days.

(21) Appl. No.: 10/638,274

(22) Filed: Aug. 8, 2003

(65) Prior Publication Data

US 2004/0065233 A1 Apr. 8, 2004

Related U.S. Application Data

(60) Provisional application No. 60/492,577, filed on Aug. 4, 2003, and provisional application No. 60/405,784, filed on Aug. 23, 2002.

(51) Int. Cl.[7] .............................................. C04B 16/02

(52) U.S. Cl. ....................... 106/644; 106/711; 106/724; 106/726; 106/731; 428/396

(58) Field of Search ................................ 106/726, 724, 106/731, 711, 644; 428/396

(56) References Cited

U.S. PATENT DOCUMENTS 1,349,901 A 8/1920 Meischke-Smith
1,571,048 A 1/1926 Garrow
1,913,707 A 6/1933 Etheridge
2,023,800 A 12/1935 Williamson
2,153,837 A 4/1939 Hybinette
2,377,484 A 6/1945 Elmendorf
2,677,955 A 5/1954 Constantinesco (Continued)

FOREIGN PATENT DOCUMENTS

| | | |
|---|---|---|
| CH | 216 902 A1 | 9/1941 |
| EP | 0 427 317 A2 | 5/1991 |
| EP | 0 548 371 A1 | 6/1993 |
| JP | 54 091520 A1 | 7/1979 |
| WO | WO-00/38607 A1 | 7/2000 |

OTHER PUBLICATIONS

Database WPI, Section Ch, Week 198025, Derwent Publications Ltd., London, GB, AN 1980–44381C, XP002266243 & JP 55 063248 A (Matsushita Electric Works Ltd.), May 13, 1980.

*Primary Examiner*—Paul Marcantoni
(74) *Attorney, Agent, or Firm*—Darby & Darby

(57) ABSTRACT

The present invention relates to a fiber-reinforced cement based or cementitious material, and process for making, where the reinforcing fiber is a chemically treated cellulose or non-cellulose fiber. The fiber reinforced cementitious material includes (i) cement, (ii) optionally, sand, aggregate, or sand and aggregate, and (iii) chemically treated fibers having a polyvalent cation content of from about 0.1 weight percent to about 5.0 weight percent based on the dry weight of the treated fibers. The present invention further provides for a fiber reinforced cementitious material having a weak acid content of from about 0.5 weight percent to about 10 weight percent based on the dry weight of the treated fibers.

119 Claims, 17 Drawing Sheets

U.S. PATENT DOCUMENTS

| | | | | |
|---|---|---|---|---|
| 3,264,125 | A | | 8/1966 | Bourlin |
| 3,679,445 | A | | 7/1972 | Howe |
| 3,753,749 | A | | 8/1973 | Nutt |
| 4,089,439 | A | | 5/1978 | Dearlove et al. |
| 4,092,737 | A | | 5/1978 | Sandell |
| 4,133,928 | A | | 1/1979 | Riley et al. |
| 4,188,454 | A | | 2/1980 | Foley et al. |
| 4,261,754 | A | | 4/1981 | Krenchel et al. |
| 4,287,020 | A | | 9/1981 | Moore |
| 4,287,365 | A | | 9/1981 | Becker et al. |
| 4,306,911 | A | * | 12/1981 | Gordon et al. .............. 106/644 |
| 4,310,478 | A | | 1/1982 | Balslev et al. |
| 4,369,201 | A | | 1/1983 | Kober |
| 4,400,217 | A | | 8/1983 | Kober |
| 4,406,703 | A | | 9/1983 | Guthrie et al. |
| 4,483,727 | A | | 11/1984 | Eickman et al. |
| 4,486,501 | A | | 12/1984 | Holbek |
| 4,510,020 | A | | 4/1985 | Green et al. |
| 4,524,101 | A | | 6/1985 | Eickman et al. |
| 4,647,505 | A | | 3/1987 | Blackie et al. |
| 4,655,111 | A | | 4/1987 | Blaker et al. |
| 4,671,413 | A | | 6/1987 | Peterson |
| 4,828,618 | A | | 5/1989 | De Chiffre et al. |
| 4,861,812 | A | | 8/1989 | McAlpin et al. |
| 4,927,462 | A | * | 5/1990 | Sugama ...................... 106/724 |
| 4,961,790 | A | | 10/1990 | Smith et al. |
| 4,968,561 | A | | 11/1990 | Mizobe et al. |
| 4,985,119 | A | | 1/1991 | Vinson et al. |
| 5,000,824 | A | | 3/1991 | Gale et al. |
| 5,021,093 | A | | 6/1991 | Beshay |
| 5,096,539 | A | | 3/1992 | Allan |
| 5,102,596 | A | | 4/1992 | Lempfer et al. |
| 5,120,367 | A | | 6/1992 | Smith et al. |
| 5,196,061 | A | | 3/1993 | Thomas et al. |
| 5,203,629 | A | | 4/1993 | Valle et al. |
| 5,223,090 | A | | 6/1993 | Klungness et al. |
| 5,224,595 | A | | 7/1993 | Sugimoto et al. |
| 5,224,774 | A | | 7/1993 | Valle et al. |
| 5,232,779 | A | | 8/1993 | Spehner |
| 5,320,851 | A | | 6/1994 | de Mars et al. |
| 5,362,562 | A | | 11/1994 | Evans et al. |
| 5,385,978 | A | | 1/1995 | Evans et al. |
| 5,399,195 | A | | 3/1995 | Hansen et al. |
| 5,453,310 | A | | 9/1995 | Andersen et al. |
| 5,480,256 | A | | 1/1996 | Itsekson et al. |
| 5,492,759 | A | | 2/1996 | Eriksson et al. |
| 5,494,748 | A | | 2/1996 | Spehner |
| 5,561,173 | A | | 10/1996 | Dry |
| RE35,460 | E | | 2/1997 | Klungness et al. |
| 5,601,921 | A | | 2/1997 | Eriksson |
| 5,643,359 | A | | 7/1997 | Soroushian et al. |
| 5,728,209 | A | | 3/1998 | Bury et al. |
| 5,785,419 | A | | 7/1998 | McKelvey |
| 5,795,515 | A | | 8/1998 | Fischer |
| 5,807,458 | A | | 9/1998 | Sanders et al. |
| 5,851,281 | A | | 12/1998 | Alves |
| 5,897,701 | A | | 4/1999 | Soroushian et al. |
| 5,897,928 | A | | 4/1999 | Sanders et al. |
| 5,931,610 | A | | 8/1999 | Rixom et al. |
| 5,985,449 | A | | 11/1999 | Dill |
| 5,989,335 | A | | 11/1999 | Soroushian et al. |
| 6,030,447 | A | | 2/2000 | Naji et al. |
| 6,074,524 | A | | 6/2000 | Wu et al. |
| 6,138,430 | A | | 10/2000 | Van Acoleyen et al. |
| 6,159,335 | A | | 12/2000 | Owens et al. |
| 6,183,123 | B1 | | 2/2001 | Sniegowski et al. |
| 6,201,050 | B1 | | 3/2001 | Kaiser et al. |
| 6,283,327 | B1 | | 9/2001 | Rubtsov |
| 6,302,954 | B1 | | 10/2001 | Lunkenheimer et al. |
| 6,340,408 | B1 | | 1/2002 | Norlander |
| 6,345,777 | B1 | | 2/2002 | Leaver |
| 6,346,146 | B1 | | 2/2002 | Duselis et al. |
| 6,348,093 | B1 | | 2/2002 | Rieder et al. |
| 6,379,457 | B1 | | 4/2002 | Yamamoto et al. |
| 6,503,319 | B1 | | 1/2003 | Courage et al. |
| 6,550,362 | B1 | | 4/2003 | Galinat et al. |
| 6,554,465 | B2 | | 4/2003 | Cruso |
| 6,562,430 | B1 | | 5/2003 | Leon |
| 6,569,233 | B2 | | 5/2003 | Macklin et al. |
| 6,676,745 | B2 | * | 1/2004 | Merkley et al. ............ 106/726 |
| 2002/0007926 | A1 | | 1/2002 | Jewell et al. |
| 2002/0059886 | A1 | | 5/2002 | Merkley et al. |
| 2002/0069791 | A1 | | 6/2002 | Merkley et al. |
| 2002/0088584 | A1 | | 7/2002 | Merkley et al. |
| 2002/0160174 | A1 | | 10/2002 | Nanko et al. |
| 2002/0170468 | A1 | | 11/2002 | Luo et al. |
| 2003/0041983 | A1 | | 3/2003 | Jewell et al. |
| 2003/0056694 | A1 | | 3/2003 | Macklin et al. |
| 2003/0056695 | A1 | | 3/2003 | Macklin et al. |
| 2003/0116063 | A1 | | 6/2003 | Macklin et al. |

* cited by examiner

CEMENTITIOUS MATERIAL REINFORCED WITH CHEMICALLY TREATED CELLULOSE FIBER

CROSS-REFERENCE TO RELATED APPLICATIONS

This application claims priority under 35 U.S.C. § 119, based on U.S. Provisional Application Ser. No. 60/405,784, filed Aug. 23, 2002, and on U.S. Provisional Application Ser. No. 60/492,577, filed Aug. 4, 2003, the entire disclosures of which is hereby incorporated by reference.

FIELD OF THE INVENTION

This invention relates to a cementitious material reinforced with a chemically treated cellulose fiber, and chemically treated cellulose fibers and processes for their production.

BACKGROUND OF THE INVENTION

U.S. Pat. Nos. 1,048,913; 1,349,901; 1,571,048; 1,633,219; 1,913,707; 2,377,484; and 2,677,955 relate to the use of various materials including fibers in concrete. Early efforts were aimed at improving crack resistance and improving the energy absorption of concrete masses. U.S. Pat. Nos. 4,188,454; 4,287,365; 4,287,020; 4,310,478; 4,369,201; 4,4,400,217; 4,483,727; 4,524,101; 4,524,101; 4,861,812; 4,985,119; 4,968,561; 5,000,824; 5,196,061; 5,362,562; 5,385,978; 5,399,195; and 5,453,310, 5,643,359, 5,897,701, all of which are hereby incorporated by reference in their entirety, relate to various efforts to provide improved reinforced materials. It was recognized that cellulosic materials were widespread, abundant and relatively inexpensive. However, it was also recognized that cellulosic materials were of limited value in many compositions because of the harsh alkaline environment of many cementitious mixtures, which caused physical degradation of the cellulosic fibers in curing of the mixture.

SUMMARY OF THE INVENTION

It would be advantageous to be able to provide a cellulose fiber and a non-cellulosic fiber for admixture in cementitious materials which is resistant to structural degradation in the harsh alkaline environment of many cementitious mixtures, and, which, therefore, is effective in reinforcement of the microenvironment around individual fibers and in preventing the initiation of microcracks.

This invention provides a cellulose fiber-reinforced cementitious material including (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and the chemically treated cellulose fibers have a Molecular Weight Stability Ratio (MWSR) of about 0.82 or greater. In preferred embodiments, the polyvalent cation is aluminum ion, and the chemical treatment further includes treatment with a weak acid. Preferred cellulose fibers are southern softwood kraft (SSK).

In a preferred aspect, this invention provides a cellulose fiber reinforced cementitious material comprising (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and having a weak acid content of from about 0.5 weight percent to about 10 weight percent based on the dry weight of the treated fibers.

In another embodiment this invention provides a non-cellulosic fiber reinforced cementitious material including (A) cement, (B) optionally, sand, aggregate, or sand and aggregate, and (C) chemically treated non-cellulose fibers having a polyvalent cation content of from about 0.1 weight percent to about 5.0 weight percent based on the dry weight of the treated fibers, and the chemically treated non-cellulose fibers have a Molecular Weight Stability Ratio (MWSR) of about 0.82 or greater.

Within the scope of this invention are poured concrete structures containing the cementitious material of this invention.

In a further embodiment of this invention is a process for the preparation of a cementitious material including mixing together materials which include:

(A) cement, (B) optionally, sand, aggregate, or sand and aggregate, and (C) chemically treated cellulose or non-cellulose fibers having a polyvalent cation content of from about 0.1 weight percent to about 5.0 weight percent based on the dry weight of the treated fibers, and the chemically treated cellulose fibers have a Molecular Weight Stability Ratio (MWSR) of about 0.82 or greater. Cementitious materials produced by the process are within the scope of this aspect of this invention.

In a further aspect of this invention there is provided a cellulose fiber reinforced cementitious material comprising (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and having a buffer salt content, a buffer salt weak acid combination content, an insoluble metal hydroxide content or an antioxidant content of from about 0.5 weight percent to about 10 weight percent based on the dry weight of the treated fibers. In this aspect of this invention a non-cellulosic fiber as described herein may used in place of the cellulosic fiber, provided that other elements of the composition remain the same.

In a further aspect of this invention there is provided a process for the preparation of a cementitious material comprising mixing together materials which include:

(A) cement, (B) optionally, sand, aggregate, or sand and aggregate, and (C) chemically treated cellulose or non-cellulosic fibers having a polyvalent cation content of from about 0.1 weight percent to about 5.0 weight percent based on the dry weight of the treated fibers, and having a weak acid content of from about 0.5 weight percent to about 10 weight percent based on the dry weight of the treated fibers.

DETAILED DESCRIPTION

Figure 1:
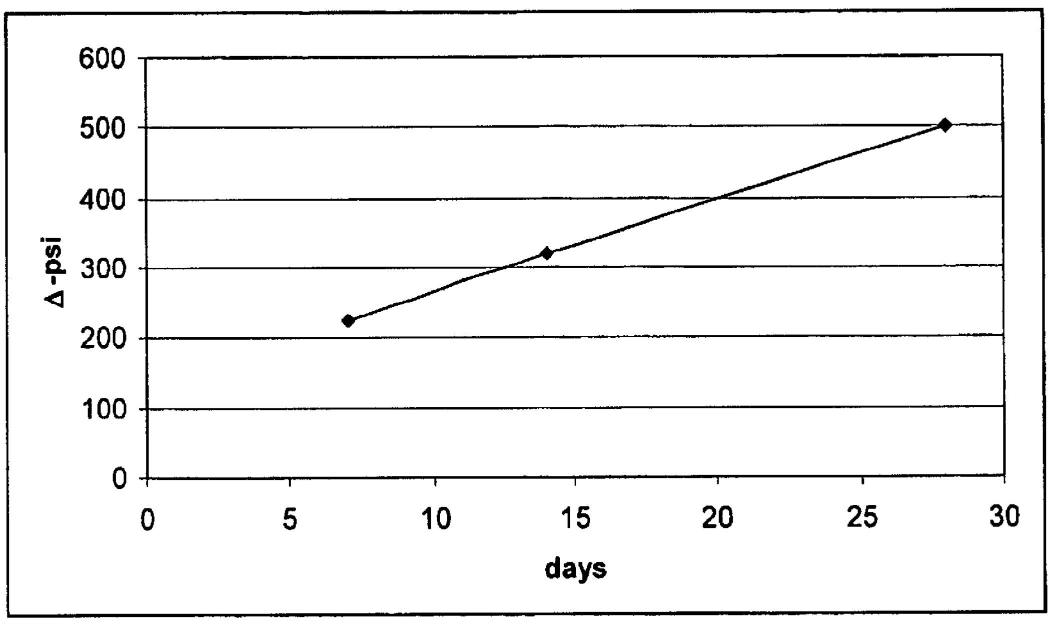
FIG. 1 is a graph demonstratings an improvement in Treated Fiber 1 (TF1) reinforced concrete strength as change in compressive strength (change in psi) over time.

All patents, patent applications, and publications cited in this specification are hereby incorporated by reference in their entirety. In case of a conflict in terminology, the present disclosure controls.

The present invention is a fiber-reinforced cement based or cementitious material where the reinforcing fiber is a chemically treated cellulose fiber.

Cellulose Fibers

Cellulosic fibrous materials suitable for use in the present invention include softwood fibers and hardwood fibers. See M. J. Kocurek & C. F. B. Stevens, *Pulp and Paper Manufacture—Vol.* 1: *Properties of Fibrous Raw Materials and Their Preparation for Pulping,* which is hereby incorporated by reference in its entirety, The Joint Textbook Committee of the Paper Industry, 1983, 182 pp. Exemplary, though not exclusive, types of softwood pulps are derived from slash pine, jack pine, radiata pine, loblolly pine, white spruce, lodgepole pine, redwood, and douglas fir. North American southern softwoods and northern softwoods may be used, as well as softwoods from other regions of the world. Hardwood fibers may be obtained from oaks, genus *Quercus,* maples, genus *Acer,* poplars, genus *Populus,* or other commonly pulped species. In general, softwood fibers are preferred due to their longer fiber length as measured by T 233 cm-95, and southern softwood fibers are most preferred due to a higher coarseness as measured by T 234 cm-84, which leads to greater intrinsic fiber strength as measured by breaking load relative to either northern softwood or hardwood fibers.

The fibrous material may be prepared from its natural state by any pulping process including chemical, mechanical, thermomechanical (TMP) and chemithermomechanical pulping (CTMP). These industrial processes are described in detail in R. G. Macdonald & J. N. Franklin, *Pulp and Paper Manufacture in* 3 *volumes;* $2^{nd}$ *Edition, Volume* 1: *The pulping of wood,* 1969, *Volume* 2: *Control, secondary fiber, structural board, coating,* 1969, *Volume* 3: *Papermaking and paperboard making,* 1970, The joint Textbook Committee of the Paper Industry, and in M. J. Kocurek & C. F. B. Stevens, *Pulp and Paper Manufacture, Vol.* 1: *Properties of Fibrous Raw Materials and Their Preparation for Pulping,* The joint Textbook Committee of the Paper Industry, 1983, 182 pp., both of which are hereby incorporated by reference in their entirety. Preferably, the fibrous material is prepared by a chemical pulping process, such as a Kraft or sulfite process. In particular the Kraft process is especially preferred. Pulp prepared from a southern softwood by a kraft process is often called SSK. In a similar manner, southern hardwood, northern softwood and northern hardwood pulps are designated SHK, NSK & NHK, respectively. Bleached pulp, which is fibers that have been delignified to very low levels of lignin, are preferred, although unbleached kraft fibers may be preferred for some applications due to lower cost, especially if alkaline stability is not an issue. Desirably, the chemically treated cellulose fiber has been derived from a source which is one or more of Southern Softwood Kraft, Northern Softwood Kraft, hardwood, eucalyptus, mechanical, recycle and rayon, preferably Southern Softwood Kraft, Northern Softwood Kraft, or a mixture thereof, more preferably, Southern Softwood Kraft.

Pulp consistency is a pulp-industry specific term which is defined as the bone dry fiber amount divided by the total amount which includes fiber, water, other solids, etc. and multiplied by 100 percent. Therefore, for a slurry of 12 percent consistency, every 100 kilograms of slurry would contain 12 bone dry kilograms of fiber.

Chemically Treated Cellulose Fibers

As used herein, the phrase "chemically treated" cellulose fiber (or non-cellulose fiber) means a fiber that has been treated with a polyvalent metal-containing compound to produce a fiber with a polyvalent metal-containing compound bound to it.

It is not necessary that the compound chemically bond with the fibers, although it is preferred that the compound remain associated in close proximity with the fibers, by coating, adhering, precipitation, or any other mechanism such that it is not dislodged from the fibers during normal handling of the fibers. For convenience, the association between the fiber and the compound discussed above may be referred to as the bond, and the compound may be said to be bound to the fiber. It is necessary that the interaction of the materials used to produce the polyvalent metal-containing compound in proximity to the fibers or that the polyvalent metal-containing compound itself, dissociate into individual ions, preferably in an aqueous environment, and that the ions then contact individualized cellulose fibers. For example, sheeted cellulosic fibers treated with a water insoluble aluminum compound have the same aluminum concentration before and after hammer mill disintegration with a Kamas mill. Likewise, sheeted cellulosic fibers treated with a water soluble aluminum compound have the same aluminum concentration before disintegration with a Kamas mill and after disintegration with a Kamas mill. In addition, sheeted cellulosic fibers treated with a water insoluble and a water soluble aluminum compound have the same aluminum concentration before disintegration with a Kamas mill and after disintegration with a Kamas mill.

One type of chemically treated cellulose fiber which was originally developed for use in absorbent structures is described in U.S. Pat. No. 6,562,743 and a published counterpart, WO 00/38607, both of which are hereby incorporated by reference in their entirety. This fiber is available as CARESSA® from Buckeye Technologies Inc. of Memphis, Tenn. When used in absorbent structures, the chemically treated cellulose fiber has associated with it a weak acid. When used in the cementitious material of this invention it may be used with an associated weak acid, or in an alternative embodiment, it may be used without the associated weak acid.

The requirement that the polyvalent metal-containing compound be able to dissociate into individual ions or is formed from individual ions, preferably in an aqueous environment, and that the ions then contact individualized cellulose fibers, eliminates from further consideration as potentially useful as the polyvalent metal-containing compound of this invention many polyvalent metal-containing compounds and the fibers treated therewith, such as, for example, various clays used to treat fibers in paper making.

The chemically treated cellulose fiber or the chemically treated non-cellulosic fiber of this invention is treated with from about 1 weight percent to about 20 weight percent of the polyvalent metal-containing compound, based on the dry weight of the untreated fiber, desirably with from about 2 weight percent to about 12 weight percent of the polyvalent metal-containing compound, and preferably with from about 3 weight percent to about 8 weight percent of the polyvalent metal-containing compound.

Any polyvalent metal salt including transition metal salts may be used, provided that the compound is capable of increasing the stability of the cellulose fiber or the chemically treated non-cellulosic fiber in an alkaline environment. Examples of suitable polyvalent metals include beryllium, magnesium, calcium, strontium, barium, titanium, zirconium, vanadium, chromium, molybdenum, tungsten, manganese, iron, cobalt, nickel, copper, zinc, aluminum and tin. Preferred ions include aluminum, iron and tin. The preferred metal ions have oxidation states of +3 or +4. The most preferred ion is aluminum. Any salt containing the polyvalent metal ion may be employed. Examples of suitable inorganic salts of the above metals include chlorides, nitrates, sulfates, borates, bromides, iodides, fluorides, nitrides, perchlorates, phosphates, hydroxides, sulfides, carbonates, bicarbonates, oxides, alkoxides phenoxides, phosphites, and hypophosphites. Examples of suitable organic salts of the above metals include formates, acetates, butyrates, hexanoates, adipates, citrates, lactates, oxalates, propionates, salicylates, glycinates, tartrates, glycolates, sulfonates, phosphonates, glutamates, octanoates, benzoates, gluconates, maleates, succinates, and 4,5-dihydroxy-benzene-1,3-disulfonates. In addition to the polyvalent metal salts, other compounds such as complexes of the above salts include amines, ethylenediaminetetra-acetic acid (EDTA), diethylenetriaminepenta-acetic acid (DTPA), nitrilo-triacetic acid (NTA), 2,4-pentanedione, and ammonia may be used. Preferred salts are aluminum chloride, aluminum hydroxide and aluminum sulfate.

Figure 2:
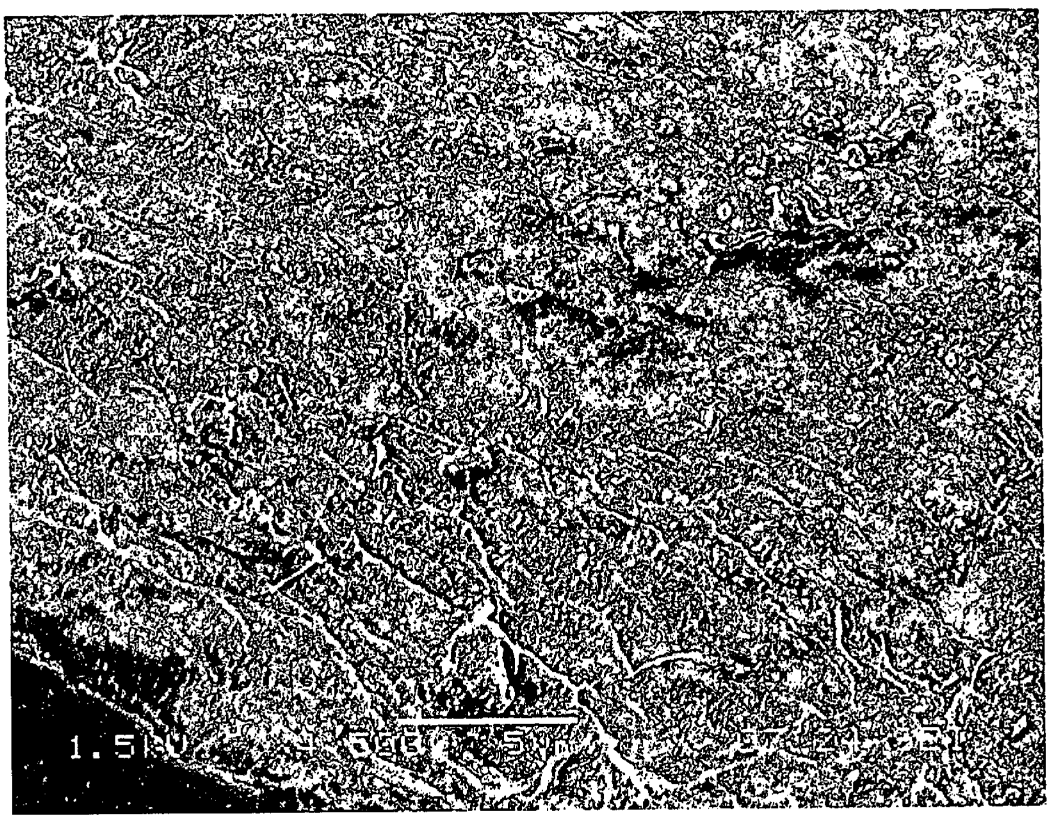
FIG. 2 is a low voltage scanning electron micrograph of Treated Fiber 1 (TF1), with a field emission SEM at a magnification of 4,500×.
Figure 3:
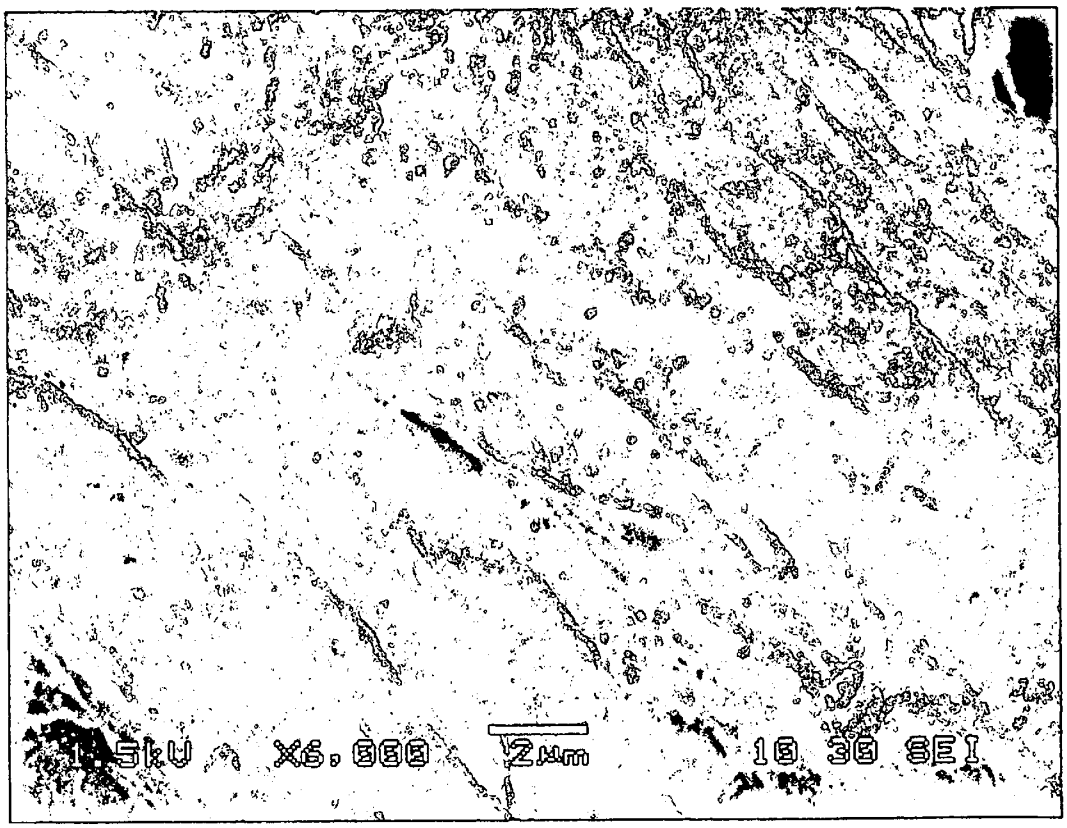
FIG. 3 is a low voltage scanning electron micrograph of Treated Fiber 1 (TF1), with a field emission SEM at a magnification of 6,000×.
Figure 4:
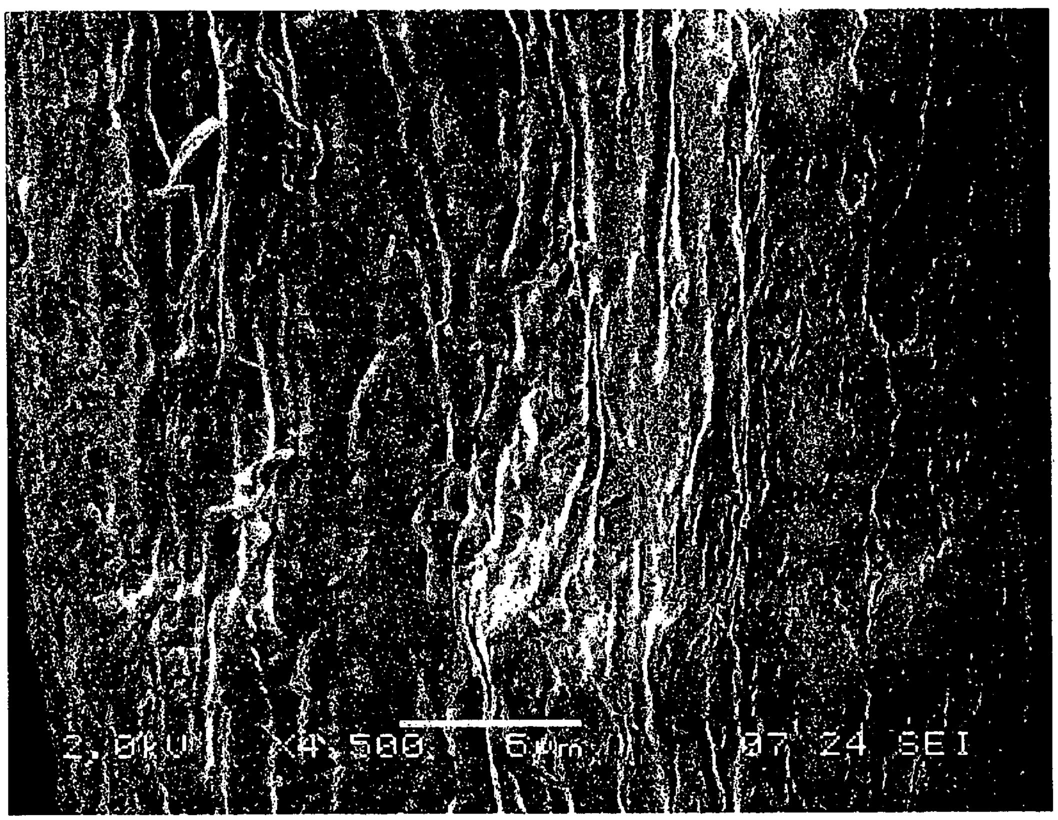
FIG. 4 is a low voltage scanning electron micrograph of untreated fiber, with a field emission SEM at a magnification of 4,500×.
Figure 5:
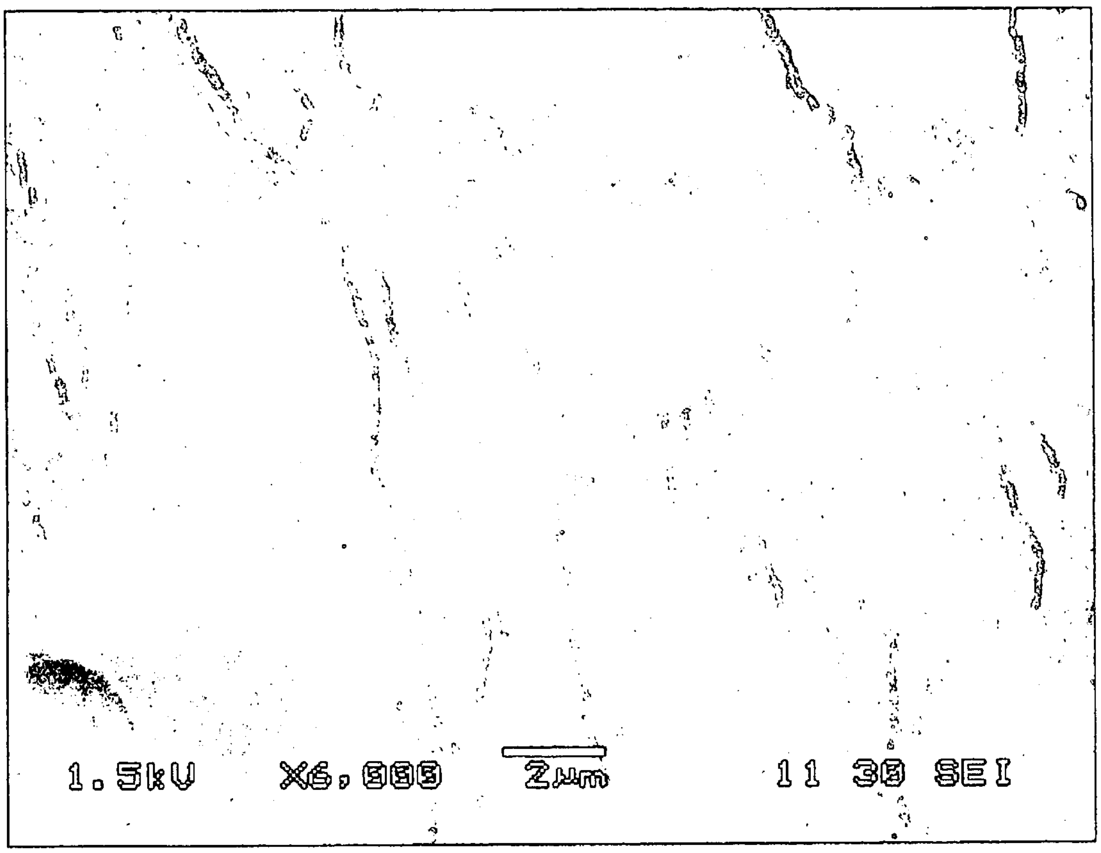
FIG. 5 is a low voltage scanning electron micrograph of untreated fiber, with a field emission SEM at a magnification of 6,000×.
Figure 6:
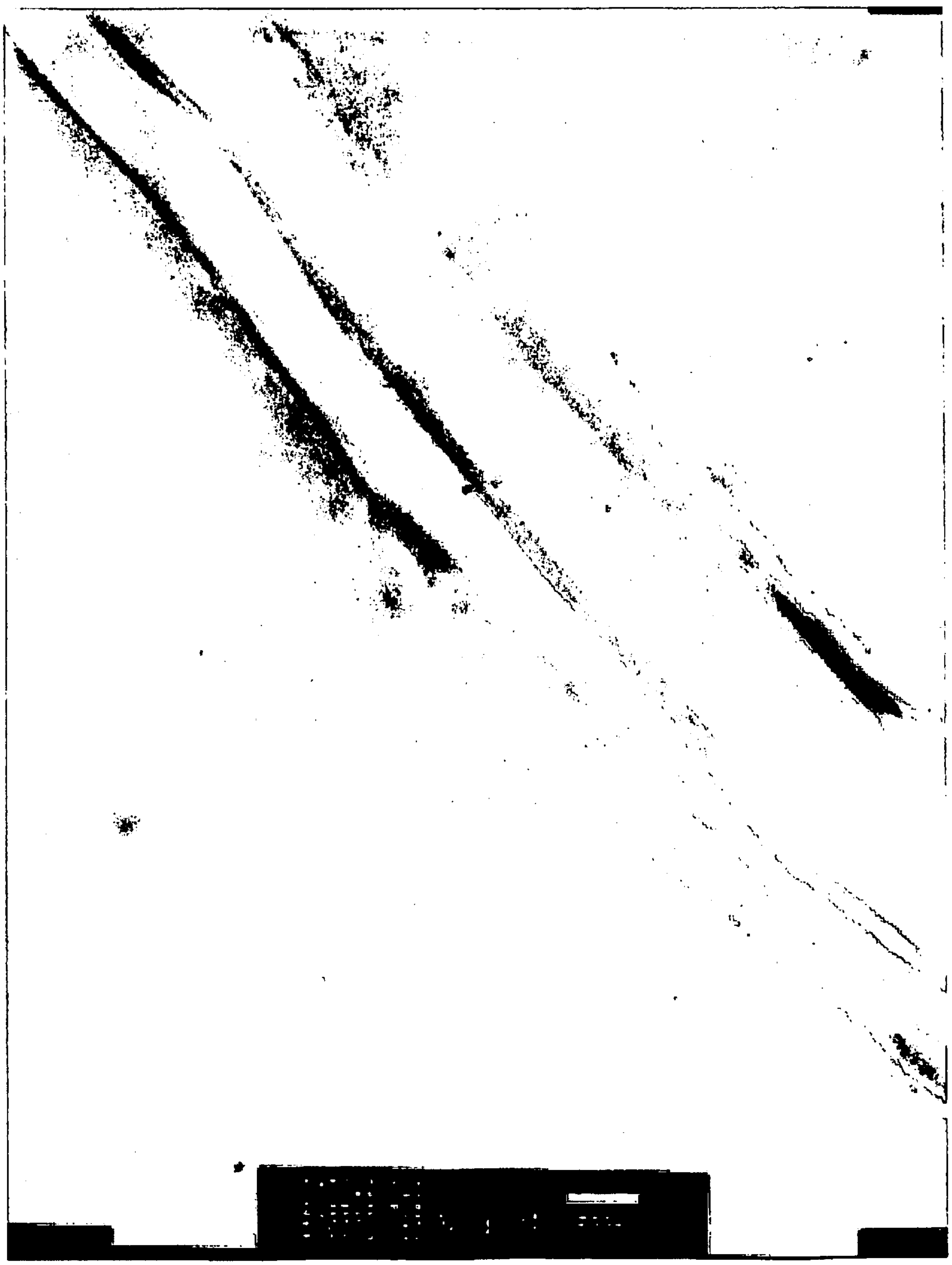
FIG. 6 is a transmission electron micrograph of untreated SSK control fibers at a magnification of 12,000×.
Figure 7:
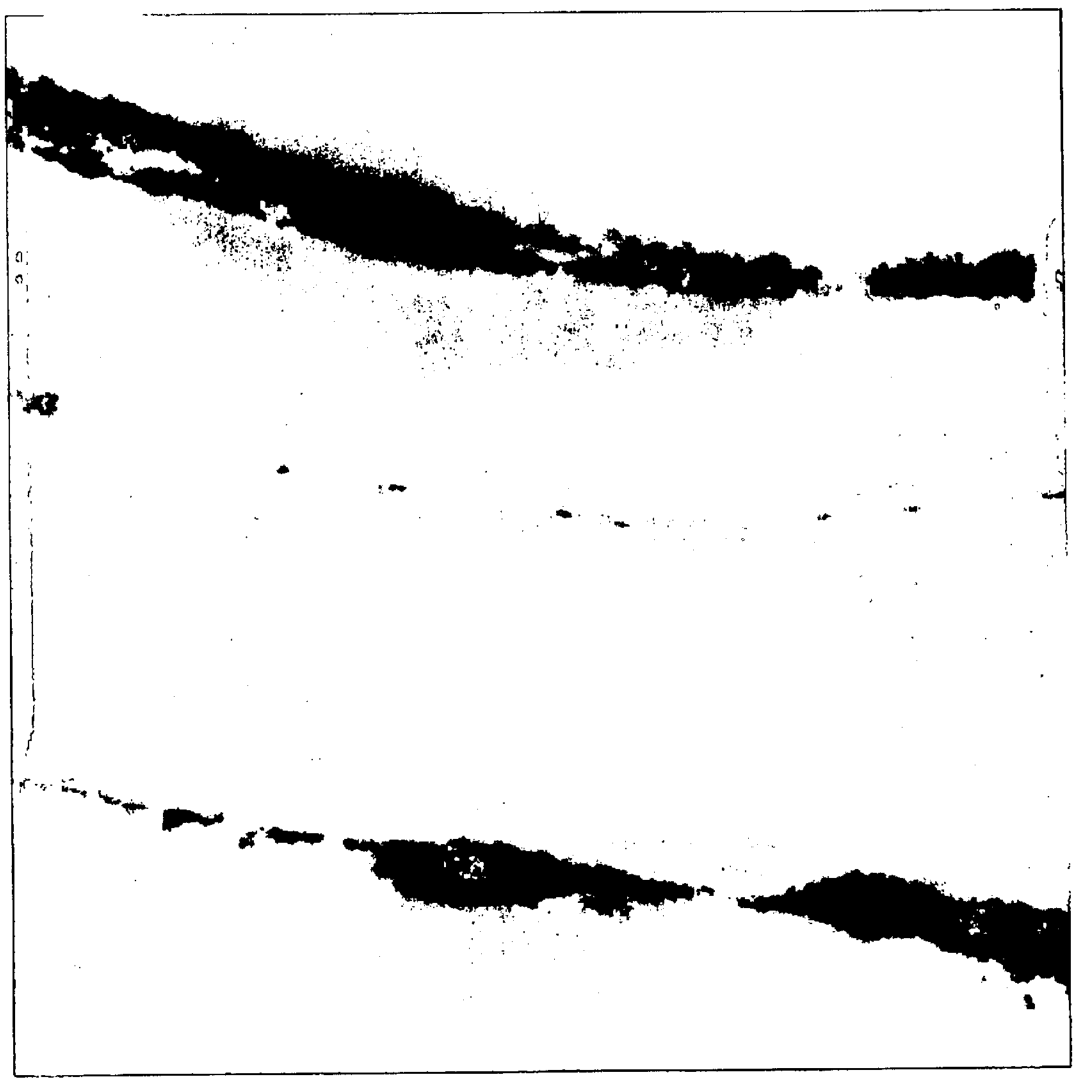
FIG. 7 is a transmission electron micrograph of Treated Fiber 1 (TF1) at a magnification of 30,000×.
Figure 8:
FIG. 8 is a transmission electron micrograph of Treated Fiber 1 (TF1) cross section at a magnification of 2,000×.
Figure 9:
FIG. 9 is a transmission electron micrograph of Treated Fiber 2 (TF2) at a magnification of 20,000×.
Figure 10:
FIG. 10 is a transmission electron micrograph of Treated Fiber 2 (TF2) cross section at a magnification of 2,500×.

Alum is an aluminum sulfate salt which is soluble in water. In an aqueous slurry of cellulose, some of the alum will penetrate the fiber cell wall, but since the concentration of ions is low, most of the dissolved aluminum salt will be outside the fiber. When the pH is adjusted to precipitate aluminum hydroxide, most of the precipitate adheres to the fiber surface. This is shown by the low voltage field emission SEMs of FIGS. 2 through 5. The untreated fibers of FIGS. 4 and 5, shown at two magnifications, show considerable surface detail and no evidence of precipitates can be seen. The surface of the treated fibers of FIGS. 2 and 3, shown at two magnifications, is obscured by the aluminum hydroxide coating, which is clearly visible in the photo. Further evidence of the effect of the chemical treatment of this invention on the surfaces of treated fibers is given in the transmission electron micrographs of FIGS. 6 through 10. These microtomed samples were approximately 100 nm in thickness. The untreated fiber of FIG. 6 has a clean surface except for several contaminant particles. Treated fiber 1 (TF1) shown in FIGS. 7 and 8 clearly has a significant coating on the surface, with only minor amounts of the material having penetrated into the lumen of the fiber. Examination of microtomed samples prepared with Treated Fiber 2 (TF2), as shown in FIGS. 9 and 10, clearly show the same phenomenon, significant coating on the surface, with only minor amounts of the material having penetrated into the lumen of the fiber.

In one embodiment of this invention, the chemically treated cellulose fiber or the chemically treated non-cellulosic fiber has an acid bound or otherwise associated with it. A variety of suitable acids may be employed, although the acid preferably should have a low volatility, and bond to the fiber. Strong mineral acids are not suitable, and, preferably, the acid used in the practice of this aspect of this invention is a weak acid. Examples include inorganic acids such as sodium bisulfate, sodium dihydrogen phosphate and disodium hydrogen phosphate, and organic acids such as formic, acetic, aspartic, propionic, butyric, hexanoic, benzoic, gluconic, oxalic, malonic, succinic, glutaric, tartaric, maleic, malic, phthallic, sulfonic, phosphonic, salicylic, glycolic, citric, butanetetracarboxylic acid (BTCA), octanoic, polyacrylic, polysulfonic, polymaleic, and lignosulfonic acids, as well as hydrolyzed-polyacrylamide and CMC (carboxymethylcellulose). Among the carboxylic acids, acids with two carboxyl groups are preferred, and acids with three carboxyl groups are more preferred. Of these acids, citric acid is most preferred.

In general, the amount of acid employed is dictated by the acidity and the molecular weight of that acid. Generally it is found that an acceptable range of acid application is from about 0.5 weight percent of the fibers to about 10 weight percent of the fibers. As used herein, the "weight percent of the fibers" refers to the weight percent of dry fiber treated with the polyvalent metal containing compound. For citric acid the preferred range of application is from about 0.5 weight percent to about 3 weight percent of the fibers. A preferred combination is an aluminum-containing compound and citric acid. For the chemically treated fibers of this aspect of this invention, it is desirable that the weak acid content of the chemically treated fibers is from about 0.5 weight percent to about 10 weight percent based on the dry weight of the treated fibers, more desirably, from about 0.5 weight percent to about 5 weight percent based on the dry weight of the treated fibers, and, preferably, from about 0.5 weight percent to about 3 weight percent based on the dry weight of the treated fibers.

Within the scope of this aspect of this invention is the use of buffer salts rather than a weak acid in combination with the polyvalent metal-containing compound. Any buffer salt that in water would provide a solution having a pH of less than about 7 is suitable. Examples of these are sodium acetate, sodium oxalate, sodium tartrate, sodium phthalate, sodium dihydrogen phosphate, disodium hydrogen phosphate and sodium borate. Buffer salts may be used in combination with their acids in a combination that in water would provide a solution having a pH of less than about 7, for example, oxalic acid/sodium oxalate, tartaric acid/sodium tartrate, sodium phthalate/phthalic acid, and sodium dihydrogen phosphate/disodium hydrogen phosphate.

In a further variation of this invention, the polyvalent metal-containing compound is used in combination with an insoluble metal hydroxide, such as, for example, magnesium hydroxide, or in combination with one or more alkali stable anti-oxidant chemicals or alkali stable reducing agents that would inhibit fiber degradation in an alkaline oxygen environment. Examples are inorganic chemicals such as sodium sulfite, and organic chemicals such as hydroquinone.

For the chemically treated fibers of this aspect of this invention, in combination with the polyvalent metal-containing compound it is desirable that the buffer salt content, the buffer salt weak acid combination content, the insoluble metal hydroxide content and/or the antioxidant content of the chemically treated fibers is from about 0.5 weight percent to about 10 weight percent based on the dry weight of the treated fibers, more desirably, from about 0.5 weight percent to about 5 weight percent based on the dry weight of the treated fibers, and, preferably, from about 0.5 weight percent to about 3 weight percent based on the dry weight of the treated fibers.

The fibers suitable for use in cementitious materials may be treated in a variety of ways to provide the polyvalent metal ion-containing compound in close association with the fibers. A preferred method is to introduce the compound in solution with the fibers in slurry form and cause the compound to precipitate onto the surface of the fibers. Alternatively, the fibers may be sprayed with the compound in aqueous or non-aqueous solution or suspension. The fibers may be treated while in an individualized state, or in the form of a web. For example, the compound may be applied directly onto the fibers in powder or other physical form. Whatever method is used, however, it is preferred that the compound remain bound to the fibers, such that the compound is not dislodged during normal physical handling of the fiber before contact of the fiber with liquid.

In a preferred embodiment, the treated fibers of the present invention are made from cellulose fiber known as FOLEY FLUFFS® from Buckeye Technologies Inc. (Memphis, Tenn.). The pulp is slurried, the pH is adjusted to about 4.0, and aluminum sulfate ($Al_2(SO_4)_3$) in aqueous solution is added to the slurry. The slurry is stirred and the consistency reduced. Under agitation, the pH of the slurry is increased to approximately 5.7. The fibers are then formed into a web or sheet, dried, and, optionally, sprayed with a solution of citric acid at a loading of 2.5 weight percent of the fibers. The web is then packaged and shipped to end users for further processing, including fiberization to form individualized fibers useful in the manufacture of the cementitious materials of this invention.

Metal ion content, including aluminum or iron content, in pulp samples is determined by wet ashing (oxidizing) the sample with nitric and perchloric acids in a digestion apparatus. A blank is oxidized and carried through the same steps as the sample. The sample is then analyzed using an inductively coupled plasma spectrophotometer, such as, for example, a Perkin-Elmer ICP 6500. From the analysis, the ion content in the sample can be determined in parts per million. The polyvalent cation content desirably is from about 0.1 weight percent to about 5.0 weight percent, based on the dry weight of the treated fibers, more desirably, from about 0.1 weight percent to about 3.0 weight percent, based on the dry weight of the treated fibers, preferably from about 0.1 weight percent to about 1.5 weight percent, based on the dry weight of the treated fibers, more preferably, from about 0.2 weight percent to about 0.9 weight percent, based on the dry weight of the treated fibers, and more preferably from about 0.3 weight percent to about 0.8 weight percent, based on the dry weight of the treated fibers.

Without intending to be bound by theory, it is believed that by this process, the soluble $Al_2(SO_4)_3$ introduced to the pulp slurry is converted to insoluble $Al(OH)_3$ as the pH is increased. The insoluble aluminum hydroxide precipitates onto the fiber. Thus, the resultant chemically treated cellulose fibers are coated with $Al(OH)_3$ or contain the insoluble metal within the fiber interior. The treatment provides protection from degradative attack for the fiber structure in the harsh alkaline environment, which is reflected in the MWSR discussed below.

If a weak acid, such as, for example, citric acid in aqueous solution is sprayed on the web containing the fibers, it dries on the fibers. When the $Al(OH)_3$ treated fibers are formulated into a cementitious material, the citric or other acid creates a locally acidic environment when the acid-treated fibers of the material are exposed to moisture upon mixing. The decreased pH created by the local acid environment may or may not exist long enough for conversion of the $Al(OH)_3$ to the soluble form of aluminum including a citric acid complex of this metal.

However, as the relatively small amount of weak acid is overwhelmed and neutralized by the alkaline materials, there may be formed a local area around the fiber which is buffered by the conjugate base salt of the weak acid. In some embodiments of this invention this is important.

Cementitious Mixture

A major problem in the state of the art up to now which limits the effectiveness of cellulosic fibers as reinforcement for cementitious materials is the harsh alkaline environment of these materials. As used herein, an "alkaline environment" is defined to be any matrix in which the pH is greater than 8 for a period of 2 or more hours.

When unprotected cellulosic fibers are introduced into this alkaline environment, degradation of the fiber starts immediately in the cementitious mixture before it has a chance to set and cure. It is important that the reinforcing fibers maintain their physical integrity if they are to be effective in reinforcing the cementitious mixture and limiting the formation of microcracks during the curing stages of the cementitious mixture. The chemically treated cellulose fiber of this invention shows stability in a harsh alkaline environment that is superior to the same cellulose fiber prior to treatment with a polyvalent metal-containing compound.

In one embodiment, the cellulose fiber reinforced cementitious material of this invention is produced by combining individualized chemically treated cellulose fibers of about 0.1–10 mm in length, about 0.001–0.1 mm in diameter and having length-to-diameter ratios of about 30–3000 with cement, water and sand, aggregate, or sand and aggregate. The cellulose fibers are derived from chemical, mechanical or thermal means, or combinations thereof, from non-wood plants, wood plants and recycled paper products, with the individualization process reducing the bonding between fibers so that they can be dispersed in conventional concrete mixtures using conventional mixing equipment at relatively low dosages of contains from about 0.1 $kg/m^3$ to about 30 $kg/m^3$ of the chemically treated cellulose fiber. The affinity of individualized pulp fibers for water facilitates their dispersion in concrete. The fresh concrete mixtures incorporating dispersed plant pulp fibers possess desirable workability, resistance to segregation and bleeding, pumpability, finishability, resistance to plastic shrinkage cracking, and reduced rebound when pneumatically applied.

Some embodiments of this invention require a substantial fraction (by weight) of the cementitious material to be the chemically treated fiber, while other embodiments make use of a very small weight percent fiber. Generally, the chemically treated cellulose fiber content of the cementitious material is from about 0.01 weight percent to about 20 weight percent based on the weight of the cementitious material, more often, from about 0.01 weight percent to about 10 weight percent based on the weight of the cementitious material, desirably, from about 0.01 weight percent to about 3 weight percent based on the weight of the cementitious material, more desirably, from about 0.01 weight percent to about 1 weight percent based on the weight of the cementitious material, preferably, from about 0.01 weight percent to about 0.5 weight percent based on the weight of the cementitious material, more preferably, from about 0.01 weight percent to about 0.1 weight percent based on the weight of the cementitious material.

Inorganic binders useful for the present invention include water-curable inorganic substances which form a matrix upon a setting, such as cement based materials, calcium silicate materials, and mixtures thereof. The chemistry of such compositions is described in P. K. Mehta and P. J. M. Monteiro, *Concrete Structure, Properties, and Materials,* Prentice Hall, 1993, [548 pp.] and P. C. Hewlett, *Lea's Chemistry of Cement and Concrete,* Fourth Edition, Butterworth-Heinemann, 1998, [1056 pp.], both of which are hereby incorporated by reference in their entirety.

As used herein, cement based or cementitious materials refers to compositions generally comprising lime, alumina, silica, and iron oxide. Applicable cement based materials include Portland cement, aluminous cement, blast furnace cement, and mixtures thereof. Portland Cement is especially contemplated for use with the present invention. In general, Portland cement is composed primarily of tetracalcium aluminoferrate (4 $CaO.Al_2O_3.Fe_2O_3$), tricalcium aluminate (3 $CaO.Al_2O_3$), tricalcium silicate (3 $CaO.SiO_2$), and dicalcium silicate ($2CaO.SiO_2$). Each of the five conventional types of Portland cement and white Portland cement may be used as the inorganic binder. These include moderate heat-of-hardening cement known in the art as Type II, high early strength (H.E.S.) cement known as Type III, low heat cement known as Type IV, and chemical resisting cement known as Type V. Especially contemplated is Type I cement which commonly used for a variety of general construction purposes. It is within the ability of one of ordinary skill in the art to modify and adjust the relative proportions of the components of Portland cement in order to enhance a particular property or prepare any of the conventional types of Portland cement, including white Portland cement, listed above.

Preparing the chemically treated cellulose fibers for use in the cementitious mixture can be accomplished easily.

Method 1: The chemically treated cellulose fibers are supplied in typical sheeted roll form with approximate sheet physical properties of basis weight about 710 $g/m^2$ and density about 0.59 $g/cm^3$. The sheet is fed into a pulp sheet disintegrator, such as, for example, a Kamas Mill, whereby the sheet form is converted into fluff form of much lower density which is from about 0.05 $g/cm^3$ to about 0.25 $g/cm^3$. The fluffed fibers are then metered into specific weights and packaged as such into small bags made of degradable material that disintegrates when placed in contact with water. These small bags are supplied to the concrete manufacturer where they are simply thrown into the concrete mix, bag and individualized chemically treated cellulose fibers, at the appropriate time to be uniformly distributed into the entire concrete batch. Based on the desired fiber loading, for example, in kg of fibers per $m^3$ of concrete, the appropriate weight and number of bags are used.

Method 2: The cellulose fibers are supplied in typical sheeted bale form with approximate sheet physical properties for basis weight of about 710 $g/m^2$ and density about 0.59 $g/cm^3$, to a concrete manufacturing site. Pulp sheets are then loaded into a tank containing water and an adequate agitator such that the sheets are blended with the water to form a uniform slurry of individual pulp fibers with a consistency ranging from 0.1 percent to 3.0 percent by weight. During the concrete mixing process, the appropriate volume of the fiber and water slurry is pumped into the concrete mixing truck to supply the needed water and fiber content for the concrete batch and to allow uniform distribution.

Chemically treated cellulose fibers may also be supplied in the form of sheeted roll or bale which has then been diced or shredded. A very desirable form is diced, which may be delivered by a variety of methods including in paper bags which disintegrate in a concrete mixer or ready mix truck, thereby releasing the dice fibers and subjecting them to the mixing action of the concrete mixer or ready mix truck.

In an alternative embodiment of this invention, chemically treated cellulose fibers are used to produce a nonwoven material, for example, by an airlaid process, and the nonwoven material is used as a reinforcement in a cementitious mixture.

In another embodiment of this invention, the chemically treated cellulose fibers hereinabove described are used in a cementitious material in the form of a reinforcement mixture or blend comprising one or more other reinforcement materials. These may be one or more of thermoplastic fibers, polyolefin fibers, polyethylene fibers, polyester fibers, nylon fibers, polyamide fibers, polyacrylonitrile, polyacrylamide, viscose, wool, silk, PVC, PVA, metal fibers, carbon fibers, ceramic fibers, steel fibers (straight, crimped, twisted, deformed with hooked or paddled ends), glass fibers, carbon fibers, natural organic and mineral fibers (abaca, asbestos, bamboo, coconut, cotton, jute, sisal, wood, rockwool), polypropylene fibers (plain, twisted, fibrillated, with buttoned ends), kevlar, rayon. In another embodiment of this invention, the chemically treated cellulose fibers hereinabove described are used in a cementitious material, either alone or in a blend with other fibers, where the cementitious material contains a latex or a mixture of latexes.

U.S. Pat. Nos. 5,453,310; 5,492,759; 5,601,921; 5,785,419; 4,985,119; 6,346,146; 6,030,447; 6,138,430; 6,379,457; 5,643,359; 5,795,515; 5,897,701, all of which are hereby incorporated by reference in their entirety, relate to various materials incorporating cellulosic fibers in cementitious mixtures. U.S. Pat. Nos. 5,492,759; 5,601,921; 6,159,335, all of which are hereby incorporated by reference in their entirety, relate to chemically treated cellulose fibers potentially useful in the practice of this invention. For various systems for the production of cementitious building materials which employ cellulose reinforcing fibers, the use of chemically treated cellulose fibers will provide an improved product.

Figure 11:
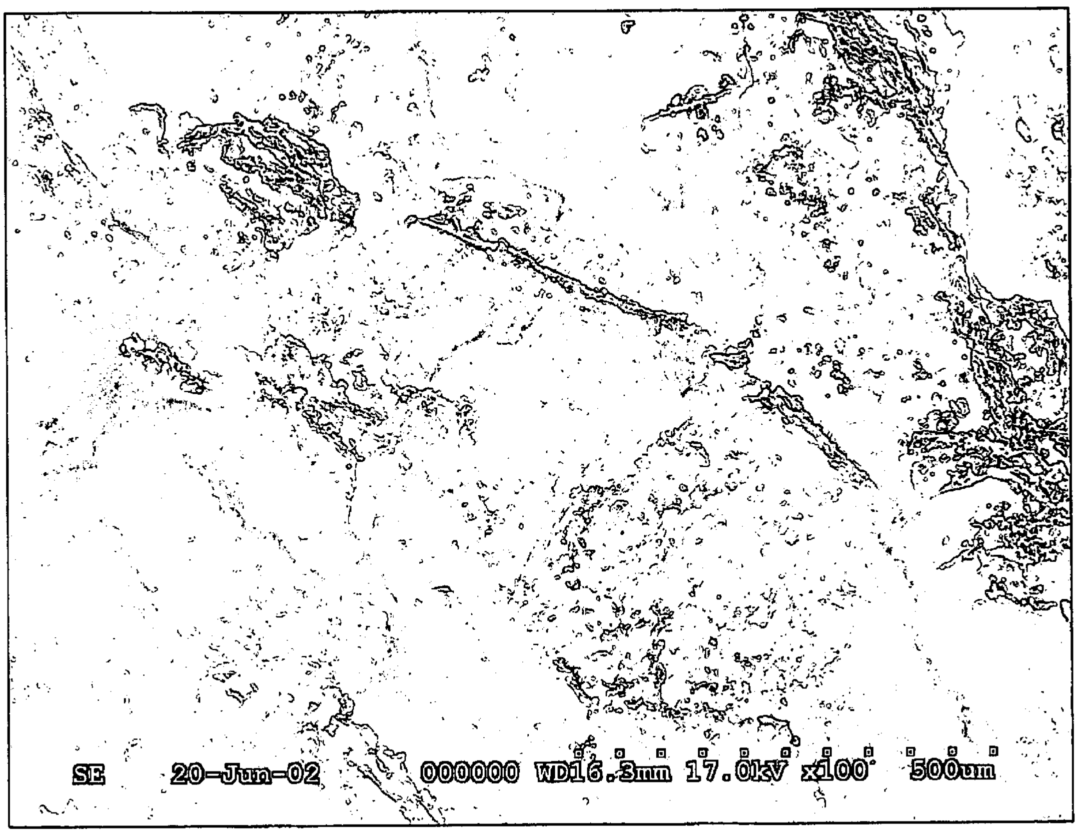
FIG. 11 is a scanning electron micrograph of concrete reinforced with TF1, at a magnification of 100×.
Figure 12:
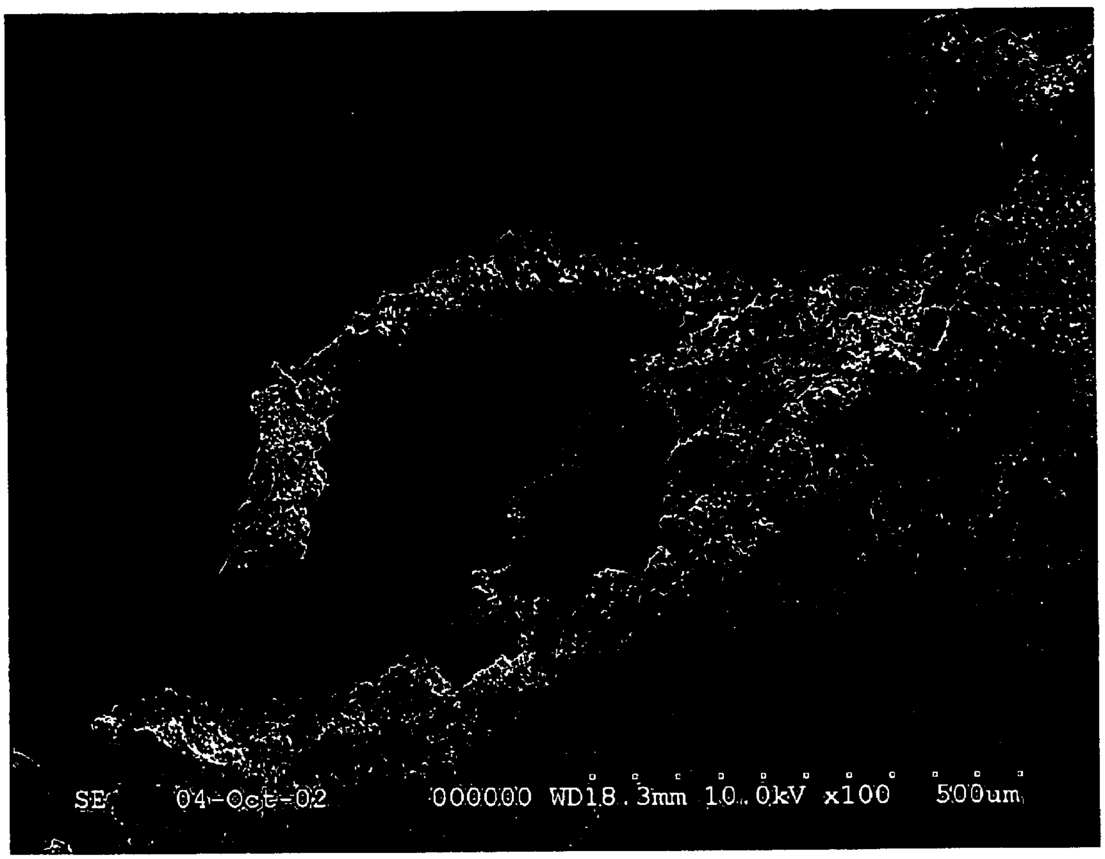
FIG. 12 is a scanning electron micrograph of fiber encrustation in concrete reinforced with TF1, at a magnification of 100×.
Figure 13:
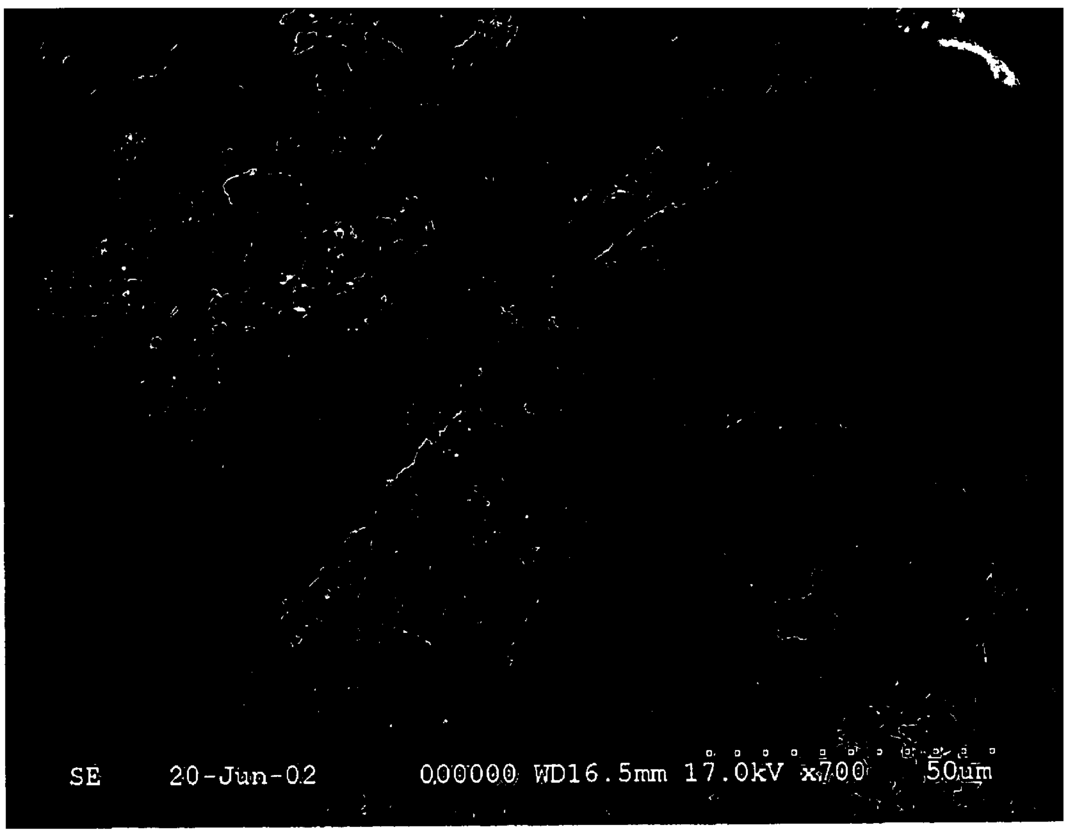
FIG. 13 is a scanning electron micrograph of fiber failure of TF1 due to fracture of concrete at a magnification of 700×.

FIGS. 11 and 13 show the appearance of treated fibers after being encased in concrete for 40 days. FIG. 12 shows encrustation of a Treated Fiber Number 1 (TF1) fiber. These samples was taken from a fiber reinforced concrete cylinder tested for 28 day compressive strength as described in Example 14 below. Microscopic examination was carried out 12 days after the compressive strength test. The lower magnification of FIG. 11 illustrates that the fibers are well dispersed, and there is no indication of the hairballs or clumping of fibers that can occur with long fibers such as synthetics or vegetable fibers such as cotton, sisal, or coconut. FIG. 13 shows a fiber that has experienced catastrophic failure of the cell wall due to this tenacious bonding into the cementitious matrix. The lumen is exposed, and no evidence of calcification is observed. Calcification, also referred to mineralization, causes the cell wall to become brittle. The fiber treatment not only provides alkali protection, but calcification protection as well. In addition, this fiber was bonded into the cementitious matrix such that fiber failure rather than pullout occurred. No obvious degradation, such as pitting or volume loss, can be observed.

Figure 14:
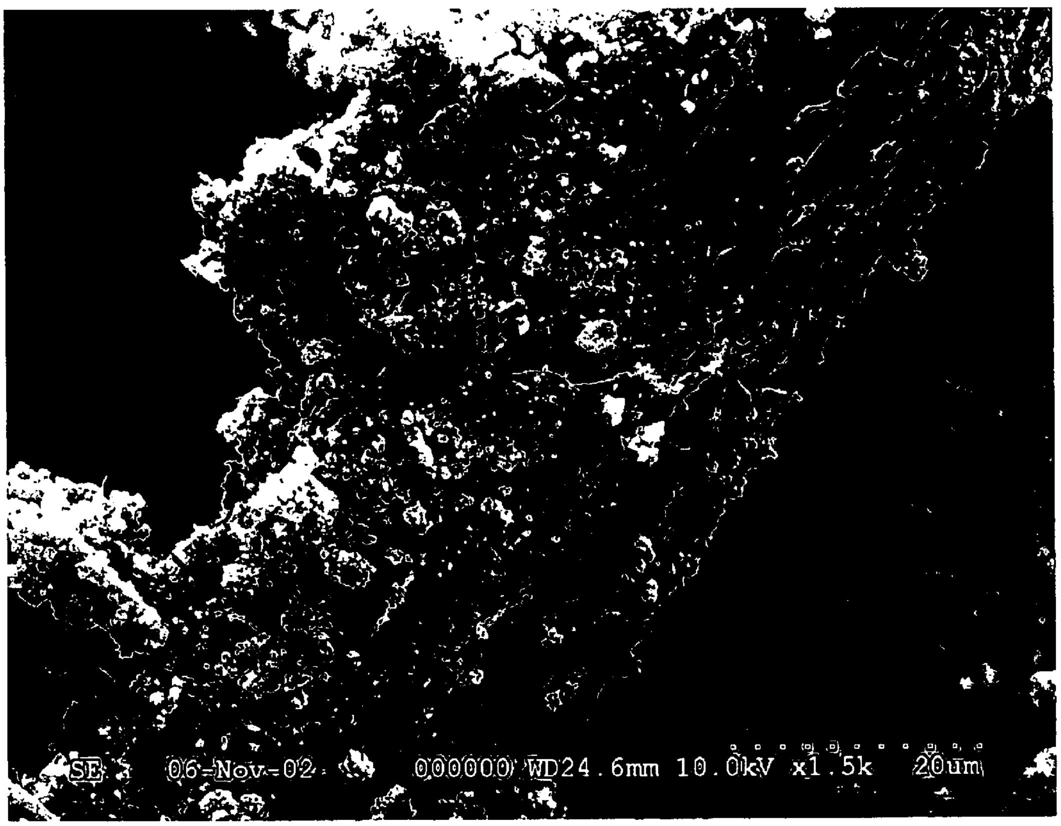
FIG. 14 is a scanning electron micrograph of concrete reinforced with TF1 at a magnification of 1500×.
Figure 15:
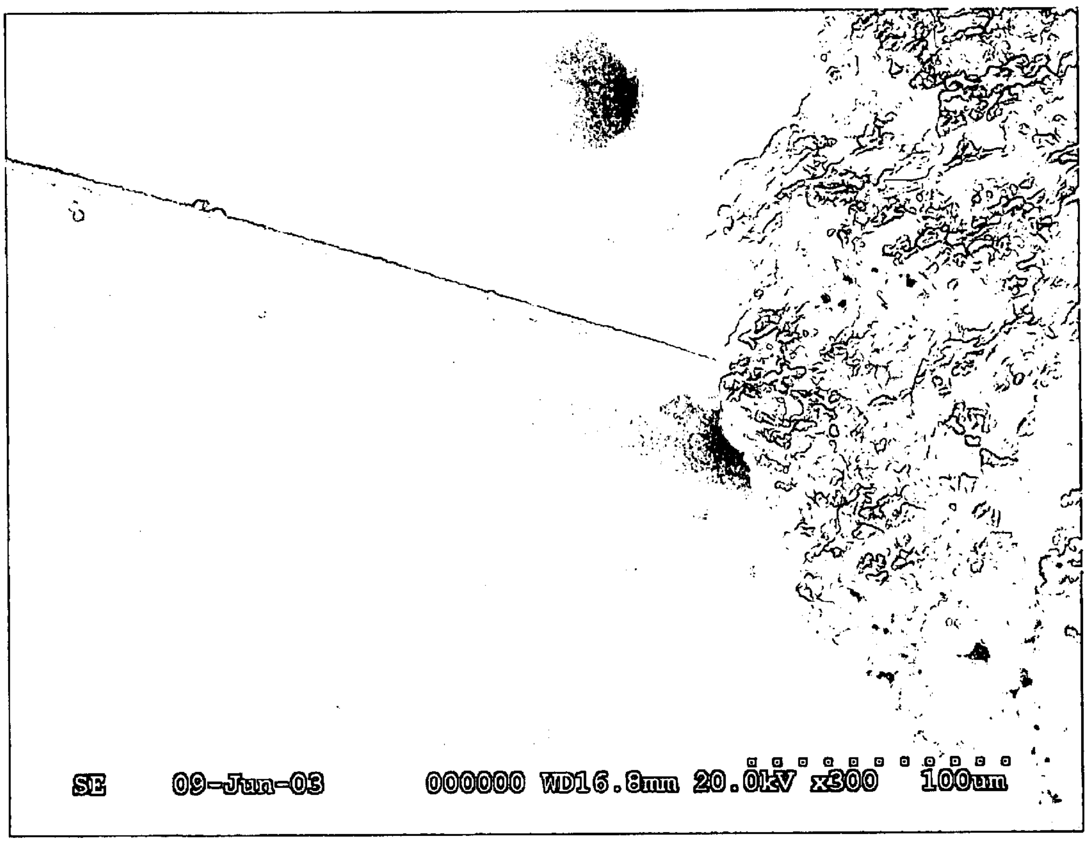
FIG. 15 is a scanning electron micrograph of concrete reinforced with synthetic polypropylene fiber at a magnification of 300×.
Figure 16:
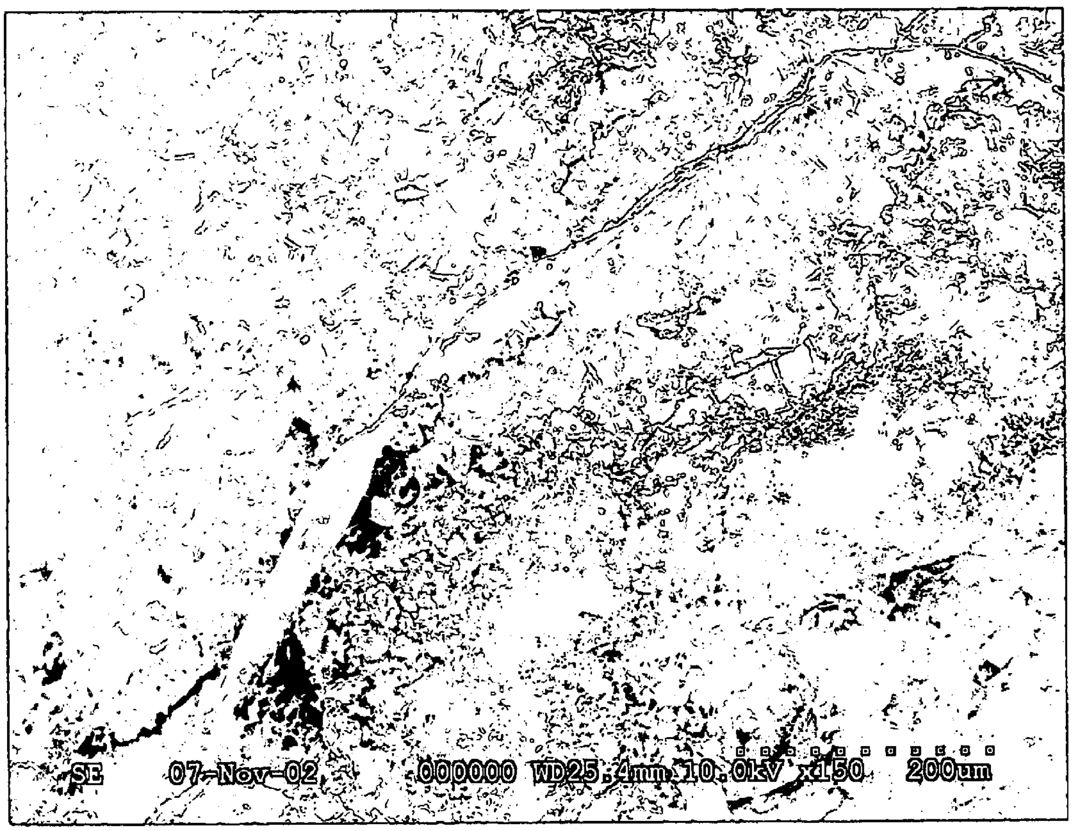
FIG. 16 is a scanning electron micrograph of concrete reinforced with TF1 at a magnification of 160×.
Figure 17:
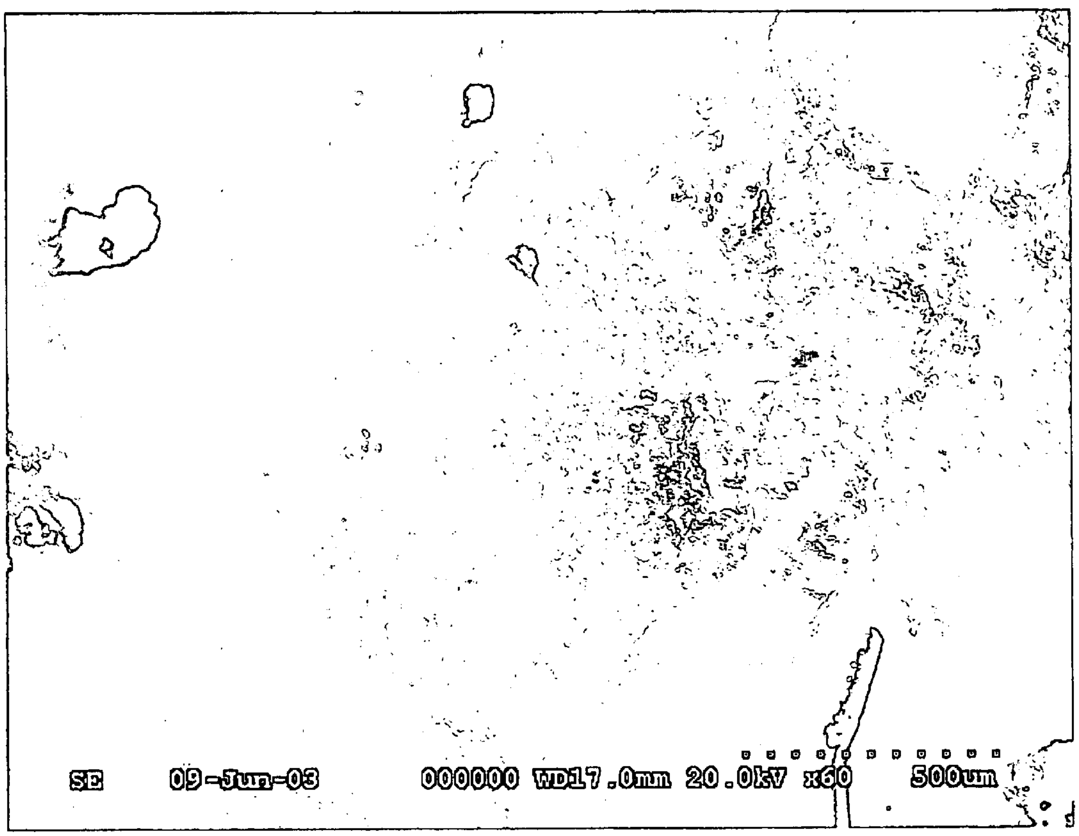
FIG. 17 is a scanning electron micrograph of concrete reinforced with synthetic polypropylene fiber at a magnification of 60×.

Further illustration of the improved bonding of the inventive fiber versus synthetic polypropylene fibers is shown in FIGS. 15 and 17. FIG. 15 shows the lack of cementitious material adhering to the surface of the polypropylene fiber after fracture. The surface texture is due to abrasion as the fiber pulled out of the cementitious matrix. FIG. 17 indicates that the bonding is so poor that the polyolefin fiber fell out of the matrix when the fracture plane was aligned with the fiber. This behavior of polypropylene synthetic fibers may be contrasted to that of treated cellulose fibers. FIGS. 11, 12 and 14 indicate that the surface of TF1, which has been prepared as described in Example 2, is tenaciously bonded to the cementitious matrix. FIGS. 11 and 16 illustrate the behavior of treated cellulose fibers oriented in the fracture plane.

As used herein, the phrase "the chemically treated cellulose fiber remains discrete with its integrity intact" has meaning best demonstrated by reference to FIGS. 11 and 13. Unlike some cellulosic materials which have a tendency to dissolve or otherwise display reduced integrity when incorporated into cementitious materials, the chemically treated cellulose fibers of this invention are individually visible and their structure has remained intact in the matrix of the cementitious material.

The cementitious materials of this invention are useful for making a wide variety of poured structures, such as, for example, highways, roads, sidewalks, driveways, parking lots, concrete buildings, bridges, and the like.

Zero-Span Stability Ratio

Because the chemically treated cellulose fibers of the present invention are well bonded into the cementitious matrix, most fibers break rather than pull free. For this reason, the single fiber strength of cellulose fibers is a very important consideration. To actually break individual fibers is very time consuming and gives highly variable results.

Reference is made herein to several ASTM tests. ASTM International is a not-for-profit organization formerly known as the American Society for Testing and Materials, which provides standards that are accepted and used in research and development, product testing, quality systems, and commercial transactions around the globe (ASTM, 100 Bar Harbour Drive, West ConSchohocken Pa., 19428-2959).

In addition, reference is made herein to several standard tests which have been published by the Technical Association for the Pulp and Paper Industry ("TAPPI"). Final test methods are promulgated by TAPPI's Standards Advisory Review Group. Detailed descriptions of these tests are available from TAPPI (15 Technology Parkway South, Norcross, Ga. 30092). A typical designation of a test is, for example, T 233 cm-95 Fiber Length of Pulp by Classification.

A standard method (TAPPI T231) is known to measure the average strength of a large number of fibers by breaking standard paper strips where the gap between the clamping jaws approaches a "zero span" distance, thus ensuring that most of the fibers break rather than pull out of the paper matrix. Through this method, it is possible to determine the effect of exposure to an alkaline environment on the single fiber strength of cellulose fibers by measuring the zero-span tensile strength of alkali treated and untreated (control) fibers. This effect is expressed as a "Zero-Span Stability Ratio" (ZSSR) as defined below:

$$ZSSR = \frac{\text{Zero-Span Tensile After Alkaline Treatment}}{\text{Zero-Span Tensile Without Alkaline Treatment}} \quad (1)$$

The ZSSR can be determined for various alkaline treatments and for various time intervals. In an adjusted method, for example, the cementitious material of this invention desirably has a 24 hour ZSSR for NaOH treatment, as determined by a procedure based on TAPPI T231 using 20 percent consistency for sealed bag testing, of about 1.0 or greater, more desirably, of about 1.04 or greater and preferably, of about 1.06 or greater.

Method to Determine Stability of Cellulose Fibers in Alkaline Environments

A preferred method for the determination of zero-span tensile and ZSSR (designated as proposed ASTM method D 6942-03) is described below. This procedure is used for determining the effect of exposure to alkaline environments on the strength of cellulose fibers by comparing the stability of different cellulose pulp fiber types based on their response to a standard alkaline solution. The stability factor, as described below, can be used to measure the effect of exposure to alkaline conditions on fiber strength.

The tests and procedures referenced for this procedure include the following:

(i) ASTM D 1695: Terminology of Cellulose and Cellulose Derivatives, see *Annual Book of ASTM Standards,* Vol. 6.03;

(ii) ASTM D 1348 Standard Test Methods for Moisture in Pulp;

(iii) TAPPI T 205: "Forming handsheets for physical tests of pulp"; and (iv) TAPPI T 231: "Zero-span breaking strength of pulp (dry zero-span tensile)".

The apparatus required in the present method includes a Handsheeting apparatus as defined in TAPPI T 205, a zero-span tensile tester as described in TAPPI T 231, a moisture balance, and an analytical balance. All values stated in SI units are to be regarded as the standard. Additional value indicated by parentheses are for information only.

Cellulose fibers are treated with a standard alkaline solution for a specified time interval, washed free of alkali, and then formed into standard handsheets for strength testing. Zero-span tensile testing is used to determine the effect on fiber strength. Specifically, this method allows various pulp types to be compared with respect to the effect of exposure to alkaline conditions on the strength of individual cellulosic fibers based on a zero-span tensile test. A stability ratio is then defined based on the ratio of the zero-span tensile of alkali treated fibers divided by the zero-span tensile of untreated control fibers.

The time intervals listed in the procedure are not critical, and more intervals of shorter or longer duration may be added. In addition, the procedure may be simplified by removing some of the intermediate intervals so long as a range of intervals is determined. An example of a simplified procedure would be to determine, for example, 4 intervals such as 1 day, 1 week, 2 weeks, 4 weeks; or 1 day, 3 day, 7 day, 14 day. However, as indicated above, other intervals may be applicable.

The specified solution, 1N sodium hydroxide (NaOH), is strongly alkaline. Although this alkali concentration is higher than some environments that would be simulated by this test, the stronger alkaline environment provides better differentiation between different cellulose fiber types. Although alkaline stability based on other alkalis, such as KOH or $Ca(OH)_2$, at a different concentration can be determined by this method, 1N NaOH is considered the standard preferred solution. Alkaline stability results from other treatments may be reported in addition to the standard solution if the additional solution(s) provide useful information.

Starting cellulose fibers should be in a dry sheet form, such as drylap, or in a dry, low-density bulk form. In this context, the term "dry" means at equilibrium moisture content, which is 6–8% moisture for most pulps. For drylap, mechanically disintegrate the pulp sheet to get 150 grams of individualized fibers for each sample to be tested. High-density pulp sheets can also be slurried at low consistency, then air-dried to provide a bulk sample of low density. The bulk, air-dry sample can then be disintegrated mechanically or by hand to provide individualized fibers.

Handsheets are to be conditioned prior to testing as described in TAPPI T 205.

Calibration and maintenance of the zero-span tensile tester will be accomplished as prescribed in TAPPI T 231. In addition, a control chart of the instrument will be maintained based on breaking paper strips cut from control sheets of paper. A ream of copy paper can be used for this purpose or any other paper with consistent furnish, uniform basis weight, and uniform density. Control paper produced on a paper machine should be tested in the machine direction.

In a preferred method, 23.3 grams of 1N NaOH are added to 10 grams, dry basis, of cellulose fibers and allowed to remain for 24 hours. This corresponds to a 30 percent consistency, corresponding to 10 grams pulp/33.3 grams total. Moisture in the pulp is ignored as long as the moisture content is less than 10 percent. A fiber sample larger than 10 grams can be used, but the starting consistency must still be 30 percent. The sample may be placed in an uncovered beaker to simulate an environment that is open to the atmosphere, or placed in a sealed bag to simulate an environment in which the consistency would remain constant.

The procedure is repeated to prepare five more samples that will be left to age for time intervals of 3, 7, 14, 21, and 28 days, respectively. Once the time interval has been met, work-up of the samples is accomplished by collecting fibers on a 100 mesh wire screen, washing with tap water until washings are substantially neutral with a pH of from 7 to 7.5, and then air drying.

Two sets of standard handsheets are then prepared according to TAPPI T 205, "Forming handsheets for physical tests of pulp", for each time interval. One set is made from pulp that has not been treated with sodium hydroxide and will be the control set. The other set is prepared from fibers that have been exposed to alkali for the designated time interval. These two sets of handsheets are prepared on the same day. Each set of handsheets is then tested for zero-span tensile according to Tappi method T 231, "Zero-span breaking strength of pulp (dry zero-span tensile)".

The zero-span stability ratio, ZSSR, is determined by dividing the zero-span tensile result of the alkali treated sample by the zero-span tensile result from the corresponding untreated control sample. The results are preferably reported as a decimal ratio, such as 0.921 or as a percentage, such as 92.1% percent. Reporting three significant figures is preferred.

The zero span stability ratios are reported individually for each time interval sample and/or as an average value of all the time interval samples tested. Note that higher ratios will be observed for pulps that have greater strength stability in an alkaline environment.

The ZSSR values, determined for each time interval sample, are reported as a decimal fraction or as a percentage along with the average zero-span stability ratio determined from all time interval samples. Since 1N NaOH is the standard test solution, it need not be specified, but if another test solution is used in addition to the standard solution, its composition must be specified.

Precision and bias for the zero-span tensile test are given in TAPPI T 231. Repeatability within a laboratory is from 3–5%, and reproducibility between laboratories (30 samples at 3 laboratories) was 10%. Repeatability of zero span tensile tests used to calculate stability ratios was found to be 5% based on 14 sets of control handsheets made at different times by two operators where each set was tested four times by cutting two test strips from two handsheets from each set for a total of 64 pulls.

Repeatability of the stability ratio is partly dependent on the type of fibers tested, such as, for example, SSK, NSK, sulfite, mechanical, etc., and the duration of the test, for example, 1 day, 1 week, 4 weeks. For samples determined in uncovered beakers, the repeatability, expressed as a percent coefficient of variation, was 5–8 percent.

Molecular Weight Stability Ratio

Using either of the aforementioned procedures (standard or adjusted method) for the determination of zero-span tensile and ZSSR, the chemically treated fibers useful for the practice of this invention desirably have an increase in ZSSR relative to that of the same fiber without chemical treatment of about 5 percent or greater, more desirably, an increase in ZSSR relative to that of the same fiber without chemical treatment of about 10 percent or greater, preferably, increase in ZSSR relative to that of the same fiber without chemical treatment of about 15 percent or greater, and more preferably, increase in ZSSR relative to that of the same fiber without chemical treatment of about 20 percent or greater.

Chemically Treated Cellulose Fibers

The chemically treated cellulose fiber suitable for use in the practice of this invention has a Molecular Weight Stability Ratio (MWSR) of about 0.82 or greater, desirably, of about 0.85 or greater, more desirably of about 0.90 or greater, preferably of about 0.95 or greater, and, more preferably, of 0.98 or greater. MWSR is defined as:

$$MWSR = \frac{Molecular\ Weight_{(NaOH)}}{Molecular\ Weight_{(water)}} \quad (2)$$

where Molecular Weight$_{(NaOH)}$ is the molecular weight of the cellulose polymer in the fibers after 24 hours of soaking in 1 N NaOH at 25° C. temperature and Molecular Weight (water) is the molecular weight of the cellulose polymer in the fibers after 24 hours of soaking in water at 25° C. temperature. The molecular weight of the cellulose polymer in the fibers is the Degree of Polymerization (DP) multiplied by 162, where DP is calculated according to the equation for cupriethylenediamine (CED) given in *The Chemistry and Processing of Wood and Plant Fibrous Materials,* Kennedy, J. F., Phillips, G. O., Williams, P. A. (eds.), Chapter 15 by Morton, J. H., Woodhead Publishing Ltd., Cambridge, Eng., 1996, which is hereby incorporated by reference in its entirety, from viscosity data. The viscosity data is determined by a procedure based on TAPPI Test 230 om-94 in which various aspects of the test have been automated. Since MWSR is a ratio, it is a dimensionless number. MW$_{(Ca(OH)2)}$ can be determined by soaking the fibers in saturated aqueous calcium hydroxide solution for 24 hours at 25° C.

In similar fashion, the DP Stability Ratio (DPSR) is $$DPSR = \frac{DP_{(NaOH)}}{DP_{(Water)}} \quad (3)$$

and in analogous fashion, VSR is the Viscosity Stability Ratio, simply the ratio of the viscosity after NaOH soaking to the viscosity after water soaking.

Chemically treated cellulose fibers useful for the practice of this invention show an improvement in fiber stability when placed in an alkaline environment in comparison to the untreated fiber from which the chemically treated cellulose fiber is prepared. The Treated Fiber Alkaline Stability Improvement (TFASI) is the ratio of the molecular weight of the treated fiber after alkaline treatment to the molecular weight of the untreated fiber after alkaline treatment and may be expressed as $$TFASI(MW) = \frac{Treated\ Fiber\ Molecular\ Weight_{(NaOH)}}{Untreated\ Fiber\ Molecular\ Weight_{(NaOH)}} \quad (4)$$

TFASI can also be determined from viscosity data as $$TFASI(V) = \frac{Treated\ Fiber\ Viscosity_{(NaOH)}}{Untreated\ Fiber\ Viscosity_{(NaOH)}} \quad (5)$$

TFASI and, in particular, TFASI$_{(V)}$, for the chemically treated cellulose fiber useful for the practice of this invention is desirably about 1.05 or greater, more desirably, about 1.1 or greater, preferably, about 1.15 or greater, and, more preferably, about 1.2 or greater.

Water retention value (WRV) is an indication of a fiber's ability to retain water under a given amount of pressure. Cellulose fibers that are soaked in water swell moderately, and physically retain water in the swollen fiber walls. When an aqueous fiber slurry is centrifuged, the majority of the water is removed from the fibers. However, a quantity of water is retained by the fiber even after centrifugation, and this quantity of water is expressed as a percentage based on the dry weight of the fiber. Most of the treated fibers of the present invention, have slightly lower WRV values than corresponding untreated fibers, which indicates that, although the treated fibers may be somewhat stiffer than untreated fibers, the absorption properties and the transport properties of the treated fibers are very similar to the untreated fibers. U.S. Pat. No. 5,190,563 describes the method for measuring WRV. It is desirable that treated fibers for use in the practice of this invention have a WRV which is about 70 percent or greater of the WRV of the untreated fiber from which the treated fiber is produced, preferable, about 80 percent or greater, and more preferably, about 90 percent or greater. This feature of the treated fibers useful in the practice of this invention is in contrast to fibers treated with clays and other mineralizing materials which fill, pack or otherwise block the pores or lumen of the fibers and which fibers consequently posses greatly altered aqueous absorption and transport properties in comparison to the fiber from which they were produced. Treated fibers useful in the practice of this invention are unmineralized.

In many applications in many climates, concrete structures made from cementitious materials are subjected to temperature variations daily or over longer periods that correspond to the freezing and thawing of water. ASTM C 666 may be used to estimate the effect of repeated freeze/thaw cycles on concrete. Concrete made from the cementitious material of this invention desirably has a freeze/thaw durability factor as measured by ASTM C 666 of about 37 percent or greater, more desirably of about 41 percent or greater and preferably, of about 45 percent or greater.

Coating fibers with mineral salts can have the effect of causing the fiber to be less absorbent by reducing the ability of water to flow into the fiber. One way to measure this property is based on determination of the Water Retention Value (WRV). The data presented in Examples 1 and 2 indicate that the untreated and treated fibers have similar WRVs. The voids in the cell walls and lumens hold about the same amount of water, and, thus, absorbency has not been significantly affected by the treatment.

Chemically Treated Non-Cellulosic Fibers

Another embodiment of this invention is cementitious materials that contain any chemically treated non-cellulosic fiber which show a TFASI$_{(V)}$ of about 1.05 or greater, more desirably, about 1.1 or greater, preferably, about 1.15 or greater, and, more preferably, about 1.2 or greater.

The chemically treated non-cellulosic fiber suitable for use in the practice of this invention desirably has an increase in ZSSR relative to that of the same fiber without chemical treatment of about 5 percent or greater, more desirably, an increase in ZSSR relative to that of the same fiber without chemical treatment of about 10 percent or greater, preferably, increase in ZSSR relative to that of the same fiber without chemical treatment of about 15 percent or greater, and more preferably, increase in ZSSR relative to that of the same fiber without chemical treatment of about 20 percent or greater.

The chemically treated non-cellulosic fiber suitable for use in the practice of this invention has a Molecular Weight Stability Ratio (MWSR) of about 0.82 or greater, desirably, of about 0.85 or greater, more desirably of about 0.90 or greater, preferably of about 0.95 or greater, and, more preferably, of 0.98 or greater. Molecular Weight Stability Ratio (MWSR) for treated non-cellulosic fibers is defined as:

$$MWSR = \frac{Molecular\ Weight_{(NaOH)}}{Molecular\ Weight_{(water)}} \quad (2)$$

where Molecular $Weight_{(NaOH)}$ is the molecular weight of the non-cellulosic fibers after 24 hours of soaking in 1 N NaOH at 25° C. temperature and Molecular $Weight_{(water)}$ is the molecular weight of the non-cellulosic fibers after 24 hours of soaking in water at 25° C. temperature. $MW_{(Ca(OH)2)}$ can be determined by soaking the fibers in saturated aqueous calcium hydroxide solution for 24 hours at 25° C. Since MWSR is a ratio it is a dimensionless number.

The practice of this alternative embodiment of this invention is the same as herein described for cementitious materials containing a chemically treated cellulose fiber, except that the chemically treated non-cellulosic fiber is substituted for the chemically treated cellulose fiber. The chemically treated non-cellulosic fiber of this embodiment may also be used in a blend with one or more chemically treated cellulose fibers to produce cementitious mixtures. As used herein the term non-cellulosic fibers includes various fibers derived from cellulosic materials, including rayon, cellulose acetate and other cellulose derivatives, as well as synthetic fibers, such as, for example, nylon. Desirably, the chemically treated non-cellulosic fiber remains discrete with its integrity intact in a cementitious mixture.

Rayon is produced by dissolving cellulose, generally derived from purified cotton or wood pulp, in a suitable solvent, then forcing the dissolved cellulose through a spinneret to regenerate the cellulose in fibrous form in a spin bath. The most commonly used commercial process today involves dissolving the cellulose in the form of its xanthate derivative in a caustic solution, then regenerating the cellulose in a sulfuric acid based spin bath. Since rayon is cellulose-based, it is also subject to alkali-induced degradation, like wood or cotton fibers, although rayon is considered a synthetic fiber rather than a natural fiber.

Fibers prepared from polymers that contain amide or ester linkages are subject to attack by alkali, which will cleave the polymer linkages, resulting in loss in molecular weight and therefore a decrease in the strength of fibers made from these polymers. Examples of natural fibers that contain amide linkages are silk and wool, in which the amide linkage arises from the peptide links between the individual amino acids that make up the protein. Examples of synthetic fibers that contain amide linkages are various types of nylon. Examples of synthetic polymers that include ester linkages include cellulose acetate and polyesters. Other polymer types, such as polyurethanes, could also be expected to be adversely affected by an alkaline environment, and thus benefit from the stabilizing chemical treatment described herein.

EXAMPLES

The present invention will be better understood by reference to the following Examples, which are provided as exemplary of the invention, and not by way of limitation.

Example 1

Southern Softwood Kraft Fibers (SSK)

In the present Example, wood chips of predominantly slash pine species were pulped through a Kraft process to a permanganate number (K number) of about 17 ml as determined by the procedure described in TAPPI method T 214. These fibers were washed and screened for quality and then bleached with a D-$E_{OP}$-D-$E_p$-D process to an ISO brightness of about 86 percent. Viscosity, as measure by T 230 om-94, was about 16 cP.

These bleached cellulose fibers were diluted with water to a slurry consisting of 0.9 parts fiber per 100 parts slurry at a pH of 6.5. The resultant slurry was continuously dewatered on a sheeting machine where the sheet was formed at a 1.0 rush/drag ratio, couched, then pressed and densified using three stages of wet pressing to 48 parts fiber per 100 parts total. The sheet was dried using conventional drum dryers to a solids content of 94 percent. The reeled pulp was then processed into individual rolls. The sheets were then defiberized in a Kamas Mill such that individual fibers were present at an average fiber length of about 2.7 mm. The disintegration efficiency was about 85 percent. The water retention value (WRV) of the fiber was found to be 79 percent. This fiber is commercially available as HP-11™ from Buckeye Technologies Inc. of Memphis Tenn.

Example 2

Treated Fibers (TF1): Treatment with Polyvalent Metal and Weak Acid

Wood chips of predominantly slash pine species were pulped through a Kraft process to a permanganate number (K number) of about 17 ml as determined by the procedure described in TAPPI method T 214. These fibers were washed and screened for quality and then bleached with a D-$E_{OP}$-D-$E_p$-D process to an ISO brightness of about 86 percent. Viscosity as measure by T 230 om-94 was about 16 cP.

These bleached cellulose fibers were diluted with water to a slurry consisting of 4.5 parts fiber per 100 parts slurry. To this slurry, 9.36 parts aluminum sulfate hydrate ($Al_2(SO_4)_3*14H_2O$) per 100 parts fiber was added. The aluminum sulfate hydrate was obtained from General Chemical Corporation. The resulting slurry had a pH of 3.2. After 25 minutes of mixing, 3.0 parts sodium hydroxide per 100 parts fiber were added along with sufficient water to provide 0.9 parts fiber per 100 parts slurry at a pH of 5.7. The temperature was adjusted to 60 degrees Celsius. The resultant slurry was continuously dewatered on a sheeting machine where the sheet was formed at a 1.0 rush/drag ratio, couched, then pressed and densified using three stages of wet pressing to 48 parts fiber per 100 parts total. The sheet was dried using conventional drum dryers to a solids content of 93.5 percent. While continuously reeling, a dosage of 50 percent citric acid supplied by Harcros Chemicals was applied to one surface of the sheet to a loading of 2.25 parts acid per 100 parts fiber. The reeled pulp was then processed into individual rolls. The sheets were then defiberized in a Kamas Mill such that individual fibers were present at an average fiber length of 2.7 mm. The disintegration efficiency was about 95 percent. The water retention value (WRV) of the fiber was found to be 73 percent. This fiber is commercially available as CARESSA® from Buckeye Technologies of Memphis Tenn.

Example 3

Treated Fibers (TF2): Treatment with Polyvalent Metal

Wood chips of predominantly slash pine species were pulped through a Kraft process to a permanganate number (K number) of about 17 ml as determined by the procedure described in TAPPI method T 214. These fibers were washed and screened for quality and then bleached with a D-$E_{OP}$-D-$E_p$-D process to an ISO brightness of about 86 percent. Viscosity as measure by T 230 om-94 is about 16 cP.

These bleached cellulose fibers were diluted with water to a slurry consisting of 4.5 parts fiber per 100 parts slurry. To this slurry, 9.36 parts aluminum sulfate hydrate ($Al_2(SO_4)_3$*$14H_2O$) per 100 parts fiber was added. The aluminum sulfate hydrate was obtained from General Chemical Corporation. The resulting slurry had a pH of 3.2. After 25 minutes of mixing, 3.0 parts sodium hydroxide per 100 parts fiber were added along with sufficient water to provide 0.9 parts fiber per 100 parts slurry at a pH of 5.7. The temperature was adjusted to 60 degrees Celsius. The resultant slurry was continuously dewatered on a sheeting machine where the sheet was formed at a 1.0 rush/drag ratio, couched, then pressed and densified using three stages of wet pressing to 48 parts fiber per 100 parts total. The sheet was dried using conventional drum dryers to a solids content of 94 percent. The reeled pulp was then processed into individual rolls. The sheets were then defiberized in a Kamas Mill such that individual fibers were present at an average fiber length of 2.7 mm. The disintegration efficiency was about 95 percent.

Example 4

Treated Fibers (TF3): Treatment with Polyvalent Metal

A slurry of bleached southern softwood Kraft (BSSK) fibers from Buckeye Technologies consisting of 4.5 parts fiber/100 parts slurry was diluted with sufficient water to provide 0.9 parts fiber/100 parts slurry and adjusted to a pH of 5.5. The resultant slurry was continuously dewatered on a sheeting machine and a sheet was formed at a rush/drag ratio of 1.0, couched, then pressed and densified through three stages of pressing to 48 parts fiber/100 parts slurry. The sheet was dried using conventional drum dryers to 93.5 percent solids. The sheet was then reeled. During reeling, 6.1 parts of hydrated aluminum sulfate ($Al_2(SO_4)_3$*14 $H_2O$, 50 percent aqueous solution) is applied by spraying per 100 parts fiber. The fiber was reeled on a continuous roll. The resultant reel was sized into individual rolls. The sample sheet was defiberized in a Kamas mill and the aluminum content of the fibers was 5500 ppm.

Example 5

Treated Fibers (TF4): Treatment with Polyvalent Metal and Acid: Iron(III) and Citric Acid 12.1 g of ferric nitrate ($Fe(NO_3)_3$) (Fisher Chemical Co.) per 152 g bleached southern softwood Kraft (BSSK) fibers from Buckeye Technologies were added to a slurry of 4.5 parts fiber/100 parts slurry. The slurry had a pH of 2.76. After mixing and dilution to 0.9 parts fiber/100 parts slurry, 27.1 ml of 10 percent sodium hydroxide were added to provide a pH of 5.7. The resultant slurry was dewatered on a dynamic handsheet former (Formette Dynamique Brevet, Centre Technique de L'Industrie, Ateliers de Construction Allimand, Appareil No. 48) and was pressed to 48 parts fiber/100 parts total. The sheet was dried to 93.5 percent solids. After drying, 2.5 parts of 50 percent citric acid solution per 100 parts of fiber were applied to the sheet by spraying. The sample sheet was defiberized in a Kamas mill as described above.

Example 6

Treated Fibers (TF5): Treatment with Polyvalent Metal and Acid: Aluminum and BTCA 9.36 parts hydrated aluminum sulfate ($Al_2(SO_4)_3$*14 $H_2O$) per 100 parts bleached southern softwood Kraft (BSSK) fibers from Buckeye Technologies were added to a slurry consisting of 4.5 parts fiber/100 parts slurry. After addition of the aluminum sulfate, the slurry had a pH of 3.2. After 25 minutes of mixing, 3.0 parts sodium hydroxide/100 parts fiber were added along with sufficient water to provide 0.9 parts fiber/100 parts slurry at a pH of 5.7 and temperature of 60° C. The resultant slurry was continuously dewatered on a sheeting machine and a sheet formed at a 1.0 rush/drag ratio, couched, then pressed and densified using three stages of pressing to 48 parts fiber/100 parts total. The sheet was dried to 93.5 percent solids. To this sheet sample was applied three parts 1,2,3,4-butanetetracarboxylic acid (BTCA) from Aldrich Chemical Company per 100 parts of fiber by spraying a solution onto the sheet surface.

Example 7

Treated Fibers (TF6): Treatment with Polyvalent Metal and Acid: Aluminum and PTSA 9.36 parts hydrated aluminum sulfate ($Al_2(SO_4)_3$*14 $H_2O$) per 100 parts bleached southern softwood Kraft (BSSK) fibers from Buckeye Technologies were added to a slurry consisting of 4.5 parts fiber/100 parts slurry. After addition of the aluminum sulfate, the slurry had a pH of 3.2. After 25 minutes of mixing, 3.0 parts sodium hydroxide/100 parts fiber were added along with sufficient water to provide 0.9 parts fiber/100 parts slurry at a pH of 5.7 and temperature of 60° C. The resultant slurry was continuously dewatered on a sheeting machine and a sheet formed at a 1.0 rush/drag ratio, couched, then pressed and densified using three stages of pressing to 48 parts fiber/100 parts total. The sheet was dried to 93.5 percent solids. To this sheet sample was applied one part para-toluenesulfonic acid (PTSA) from Aldrich Chemical Company by spraying per 100 parts of fiber onto the sheet surface.

Example 8

Treated Fibers (TF7) High Porosity Fiber

High porosity commercial fiber (HPZ®) was obtained from Buckeye Technologies Inc. in sheet form. The fibers had a WRV of 78.7, a curl of 51 percent and a 96.5 percent alpha cellulose content. A total of 7.7 parts of hydrated aluminum sulfate octadecahydrate (Aldrich Chemical Company) per 100 parts fiber were applied to the sheeted material by spraying onto the sheet surface.

Example 9

Treated Fibers (TF8) Fiber from Cotton

High purity commercial cotton fiber (GR702) was obtained from Buckeye Technologies Inc. in sheet form. A total of 7.7 parts of aluminum sulfate octadecahydrate per 100 parts fiber were applied to the sheeted material by spraying onto the sheet surface.

Example 10

Treated Fibers (TF9) Crosslinked Fiber

Fibers were prepared as disclosed in U.S. Pat. No. 5,190,563 by applying 4.7 percent citric acid and 1.6 percent sodium hypophosphite to a Southern Softwood Kraft pulp sheet. After individualizing and curing at 340° F. for 7.5 minutes, the pulp had a WRV of 44 and a curl of about 75 percent. The individualized fibers were treated by spraying 3.42 parts of hydrated aluminum sulfate ($Al_2(SO_4)_3$*14

$H_2O$) per 100 parts fiber were added to the fibers and the fibers allowed to dry. The aluminum content of the fibers was measured at 10,869 ppm.

Example 12

Treated Fibers (TF11) Polyvalent Metal and Hypophosphite

A total of 9.36 parts of hydrated aluminum sulfate ($Al_2(SO_4)_3$*14 $H_2O$) per 100 parts of bleached southern softwood Kraft (BSSK) fibers from Buckeye Technologies were added to a slurry consisting of 4.5 parts fiber/100 parts slurry. The slurry had a pH of 3.2. After 25 minutes of mixing, 3.0 parts of sodium hydroxide per 100 parts of fiber were added with sufficient water to provide 0.9 parts fiber per 100 parts slurry at a pH of 5.7 and at a temperature of 60° C. The resultant slurry was continuously dewatered on a sheeting machine where the sheet was formed at a rush/drag ratio of 1.0, couched, then treated by spraying with 12.35 parts of hydrated aluminum sulfate and 3.17 parts of sodium hypophosphite per one hundred parts of fiber, then pressed and densified through three stages of pressing to 48 parts fiber/100 parts slurry. The sheet was dried using conventional drum dryers to 93.5 percent solids. The fiber was reeled on a continuous roll. The resultant reel was sized into individual rolls. The sheets were defiberized in a Kamas mill and the aluminum content was 9475 ppm.

Example 13

Non-Reinforced Concrete

About three ft.$^3$ (0.085 $m^3$) of concrete was prepared in a commercial 6 ft.$^3$ (0.17 $m^3$) mixer by combining 564 pounds/cubic yard (335 kg/$m^3$) of type I Portland cement, 3180 pounds/cubic yard (1887 kg/$m^3$) aggregate, and 250 pounds/cubic yard (148 kg/$m^3$) of water. Each of the agregates and cement were gathered from the same lot to ensure minimal variability in composition. The coarse and fine aggregates were dried to oven dry state to eliminate the variability in water content of the mixture. Each material was batched to the nearest 0.01 lbs. (4.5 g) for accuracy. Mixing: 1. The mixer is prewetted and drained. 2. The coarse aggregate is entered into the mixer and 25 percent of the mixing water is added. This initial addition takes care of the absorption of the aggregate. 3. The mixer is turned on and the fine aggregate is added. 4. The cement is then added and then the remaining water. 5. Once all materials have been entered, the timer starts for a 3 minute mixing cycle. 6. After 3 minutes, the mixer is stopped, the opening is covered with a damp towel and the concrete rests for 3 minutes. 7. After the rest cycle, the mixer is started again for a final 2 minute mixing cycle. Ease of processing was judged by researchers based on workability, consolidation, and finishing of the concrete. Slump testing of the fresh concrete was started within 5 minutes of discharge of the material based on ASTM method C 143: *Standard Test Method for Slump of Hydraulic Cement Concrete.* Cylinders (4 inches by 8 inches) (10.16 cm×20.32 cm) were cast within 15 minutes of discharge of the material, and the compressive strength measured according to ASTM method C39: *Standard Test Method for Compressive Strength of Cylindrical Concrete Specimens.*

For results see table 1 below in Example 14.

Example 14

Fiber-Reinforced Concrete (FRC)

About three ft$^3$ (0.085 $m^3$) of concrete was prepared in a commercial 6 ft.$^3$ (0.17 $m^3$) mixer by combining 564 pounds/cubic yard (335 kg/$m^3$) of type I Portland cement, 3180 pounds/cubic yard (1887 kg/$m^3$) aggregate, 3 pounds/cubic yard (1.8 kg/$m^3$) of TF1, the treated fiber of Example 2, and 250 pounds/cubic yard (148 kg/$m^3$) of water. Each material was gathered from the same lot to ensure minimal variability in composition (i.e. aggregates and cement). The coarse and fine aggregates were dried to oven dry state to eliminate the variability in water content of the mixture. Each material was batched to the nearest 0.01 lbs. (4.5 g) for accuracy. Mixing: 1. The mixer is prewetted and drained. 2. The coarse aggregate is entered into the mixer and 25 percent of the mixing water is added. This initial addition takes care of the absorption of the aggregate. 3. The mixer is turned on, pulp fiber is added, then the fine aggregate is added. 4. The cement is then added, and then the remaining water. 5. Once all materials have been entered, the timer starts for a 3 minute mixing cycle. 6. After 3 minutes, the mixer is stopped, the opening is covered with a damp towel and the concrete rests for 3 minutes. 7. After the rest cycle, the mixer is started again for a final 2 minute mixing cycle. Ease of processing was judged by researchers based on workability, consolidation, and finishing of the concrete. Slump testing of the fresh concrete was started within 5 minutes of discharge of the material based on ASTM method C143: *Standard Test Method for Slump of Hydraulic Cement Concrete.* Cylinders (4 inches by 8 inches) (10.16 cm×20.32 cm) were cast within 15 minutes of discharge of the material, and the compressive strength measured according to ASTM method C39: *Standard Test Method for Compressive Strength of Cylindrical Concrete Specimens.* No differences in ease of processing were observed between control and fiber reinforced concrete. Improvements in slump and compressive strength were found for the fiber reinforced sample (see table 1). Although no difference was seen in actual workability, the higher slump indicates the treated fiber (TF1) reinforced concrete should have better flow properties, and that further strength improvements would be observed if the concretes were compared at equal slump.

TABLE 1

Concrete improvements from inventive fiber TF1

| Sample | Slump in. (cm) | Compressive strength - psi (kPa) 7-day | 14-day | 28-day |
|---|---|---|---|---|
| Comparative Concrete | 2.0(5.08) | 3125(21546) | 4135(28510) | 7265(50090) |
| TF1 Reinforced Concrete | 4.5(11.4) | 3350(23097) | 4455(30716) | 7765(53538) |

This improvement is shown graphically in FIG. 1 by plotting the difference in compressive strength versus time. It should be noted, however, that further experiments did not reproduce the slump data.

Example 15

Determination of Fiber Alkali Stability Using NaOH

To simulate the alkaline environment of cement formulations (see reference 4 in the publications section), comparative (SSK) and treated (TF1) fibers were soaked in water and soaked in 1N NaOH overnight at room temperature and tested for viscosity as measured by the procedure given in TAPPI method T 230. This viscosity was also converted to a Degree of Polymerization $DP_w$ based on the equation for cupriethylenediamine (CED) published in *The Chemistry*

*and Processing of Wood and Plant Fibrous Materials,* Kennedy, J. F., Phillips, G. O., Williams, P. A. (eds.), Chapter 15 by Morton, J. H., Woodhead Publishing Ltd., Cambridge, Eng., 1996:

$$DP_w=118.019*\ln^2 CED+598.404*\ln CED-449.61;$$ where $CED$= viscosity result in *cP.*

The viscosity stability ratio (VSR) is determined by dividing the viscosity after alkali treatment by the viscosity after water treatment. The DP stability ratio (DPSR) is calculated in the same manner. See Table 2 for results. Less viscosity loss (i.e. lower DP loss) indicates the cellulose in the inventive fiber is better protected from alkali-induced degradation.

TABLE 2

Alkali stability of inventive fiber: viscosity, DP, stability ratios & improvement

| Sample | viscosity cP | DP | VSR | DPSR | TFASI V | TFASI MW |
|---|---|---|---|---|---|---|
| SSK - $H_2O$ treatment | 16.90 | 2186 | — | — | — | — |
| SSK - NaOH treated | 11.30 | 1695 | 0.67 | 0.78 | — | — |
| TF1 - $H_2O$ treatment | 15.43 | 2071 | — | — | — | — |
| TF1 - NaOH treated | 14.65 | 2007 | 0.95 | 0.97 | 1.3 | 1.18 |

Example 16

Determination of Fiber Alkali Stability Using $Ca(OH)_2$

Comparative (SSK) and treated (TF1 & TF2) fibers were soaked in 3 solutions: tap water, 1N NaOH, and saturated $Ca(OH)_2$ for about 24 hours at room temperature and tested for zero span tensile based on TAPPI method T231 in which consistency used was 20 percent and the fibers were kept in a sealed bag instead of being placed in an uncovered beaker.

Zero-span measurements were obtained by using a Pulmac zero-span tensile tester in a procedure based on TAPPI method T231 in which the clamping pressure used was that of the instrument as received from Pulmac prior to optimization. The zero-span stability ratio (ZSSR) is determined by dividing the zero-span breaking load after alkali treatment by the zero-span breaking load after water treatment. Since zero-span tensile predicts the breaking load of the individual fibers, these data clearly show that the fibers TF1 & TF2 undergo less strength degradation than the untreated fibers. See table 3 for results.

TABLE 3

Improved alkali stability of inventive fiber: zero-span tensile.

| Sample | Zero-span g | ZSSR | TFASI ZS |
|---|---|---|---|
| SSK - $H_2O$ treatment | 10150 | — | — |
| SSK - NaOH treated | 9503 | 0.94 | — |
| SSK - Ca(OH)2 treated | 9468 | 0.93 | — |
| TF1 - $H_2O$ treatment | 9345 | — | — |
| TF1 - NaOH treated | 9748 | 1.04 | 1.03 |
| TF1 - Ca(OH)2 treated | 9678 | 1.04 | 1.02 |
| TF2 - $H_2O$ treatment | 10150 | — | — |
| TF2 - NaOH treated | 10763 | 1.06 | 1.13 |
| TF2 - Ca(OH)2 treated | 11235 | 1.11 | 1.19 |

Comparing the ZSSR for SSK with TF1, both with NaOH treatment, there is an increase from a ZSSR for SSK of 0.94 to 1.04 for TF1, an increase of 10.6 percent. For TF2, the increase in ZSSR is 12.8 percent. For TF2 in comparison to SSK, both treated with calcium hydroxide, the increase in ZSSR is 19.4 percent.

Example 17

Effect of Aging on the Alkali Stability of Fiber

Comparative (SSK) and treated (TF1) fibers were exposed to 1N NaOH and saturated $Ca(OH)_2$ for various time intervals at room temperature and tested for zero span tensile as described in T 231 cm-96. The results are given in Table 4.

ZSSR values were determined from data collected by ASTM method D 6942-03.

The results in Table 4 clearly show that the cementitious materials of this invention made with treated fiber are characterized by improved retention of fiber strength as measured by the zero-span tensile in comparison to cementitious materials made with untreated fibers. The effect is most easily seen by comparing the appropriate average ZSSR values for the six time intervals.

TABLE 4

Effect of time interval on ZSSR for sodium and calcium hydroxide.

| Fiber | Alkali | 1 day | 3 day | 7 day | 14 day | 21 day | 28 day | Ave. |
|---|---|---|---|---|---|---|---|---|
| SSK | NaOH | 0.83 | 0.83 | 0.82 | 0.87 | 0.82 | 0.86 | 0.84 |
| SSK | sat.Ca (OH)2 | 0.88 | 0.93 | 0.88 | 0.92 | 0.90 | 0.92 | 0.90 |
| TF1 | NaOH | 0.96 | 0.97 | 0.95 | 0.98 | 0.93 | 0.92 | 0.95 |
| TF1 | sat.Ca (OH)2 | 1.00 | 1.00 | 0.91 | 0.92 | 0.96 | 1.00 | 0.97 |

Comparison of the average of the six determinations over different time intervals for TF1 with SSK, both treated with NaOH, shows an increase in ZSSR 13.1 percent.

Example 18

Effect of Fiber Treatment on Freeze-Thaw Performance of FRC

Fiber reinforced concretes were prepared from SSK and TF1, and tested for freeze-thaw performance according to ASTM C666. Results are given in Table 5. The improvement in durability factor was found to be significant at the 95% confidence level.

TABLE 5

Effect of fiber treatment on freeze/thaw performance.

| Fiber | Frequency 0-cycles | Frequency 150-cycles | Durability Factor % |
|---|---|---|---|
| SSK | 2250 | 1317 | 34.3 |
| TF1 | 2208 | 1550 | 49.3 |

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of which are incorporated herein by reference in their entireties for all purposes.

What is claimed is:

1. A cellulose fiber reinforced cementitious material comprising (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and having a weak acid content of from about 0.5 weight percent to about 10 weight percent based on the dry weight of the treated fibers.

2. The cementitious material of claim 1, wherein the chemically treated cellulose fiber has a WRV which is about 70 percent or greater of the WRV of the untreated fiber from which the treated fiber is produced.

3. The cementitious material of claim 1, wherein the chemically treated cellulose fiber has a 24 hour ZSSR for NaOH treatment, as determined by a procedure based on TAPPI method T231 using 20 percent consistency for sealed bag testing of about 1.0 or greater.

4. The cementitious material of claim 1, wherein the chemically treated cellulose fiber has an increase in ZSSR relative to that of the same fiber without chemical treatment of about 5 percent or greater.

5. The cementitious material of claim 1, wherein the chemically treated cellulose fiber has been treated with from about 1 weight percent to about 20 weight percent of a polyvalent metal-containing compound, based on the dry weight of the untreated fiber.

6. The cementitious material of claim 1, wherein the polyvalent cation content of the chemically treated cellulose fiber is from about 0.1 weight percent to about 3.0 weight percent based on the dry weight of the treated fibers.

7. The cementitious material of claim 6, wherein the polyvalent cation content of the chemically treated cellulose fiber is from about 0.1 weight percent to about 1.5 weight percent based on the dry weight of the treated fibers.

8. The cementitious material of claim 7, wherein the polyvalent cation content of the chemically treated cellulose fiber is from about 0.2 weight percent to about 0.9 weight percent based on the dry weight of the treated fibers.

9. The cementitious material of claim 1, wherein the chemically treated cellulose fiber has been treated with a polyvalent metal-containing compound in which the polyvalent metal is in the $3^+$ oxidation state.

10. The cementitious material of claim 1, wherein the chemically treated cellulose fiber has been treated with a compound selected from the group consisting of an aluminum-containing compound, an iron (III)-containing compound and a combination thereof.

11. The cementitious material of claim 10, wherein the chemically treated cellulose fiber has been treated with an aluminum-containing compound.

12. The cementitious material of claim 11, wherein the chemically treated cellulose fiber has been treated with aluminum sulfate.

13. The cementitious material of claim 1, wherein the chemically treated cellulose fiber has been treated with an acid selected from the group consisting of citric acid, oxalic acid, malonic acid, lactic acid and a mixture thereof.

14. The cementitious material of claim 13, wherein the chemically treated cellulose fiber has been treated with an acid selected from the group consisting of citric acid, oxalic acid and a combination thereof.

15. The cementitious material of claim 14, wherein the chemically treated cellulose fiber has been treated with citric acid.

16. The cementitious material of claim 15, wherein the chemically treated cellulose fiber has been treated with an aluminum-containing compound and citric acid.

17. The cementitious material of claim 1, wherein the chemically treated cellulose fiber content of the cementitious material is from about 0.01 weight percent to about 20 weight percent based on the weight of the cementitious material.

18. The cementitious material of claim 17, wherein the chemically treated cellulose fiber content of the cementitious material is from about 0.01 weight percent to about 10 weight percent based on the weight of the cementitious material.

19. The cementitious material of claim 18, wherein the chemically treated cellulose fiber content of the cementitious material is from about 0.01 weight percent to about 3 weight percent based on the weight of the cementitious material.

20. The cementitious material of claim 19, wherein the chemically treated cellulose fiber content of the cementitious material is from about 0.01 weight percent to about 1 weight percent based on the weight of the cementitious material.

21. The cementitious material of claim 20, wherein the chemically treated cellulose fiber content of the cementitious material is from about 0.01 weight percent to about 0.5 weight percent based on the weight of the cementitious material.

22. The cementitious material of claim 21, wherein the chemically treated cellulose fiber content of the cementitious material is from about 0.01 weight percent to about 0.1 weight percent based on the weight of the cementitious material.

23. The cementitious material of claim 1, wherein the cementitious material contains from about 0.1 $kg/m^3$ to about 30 $kg/m^3$ of the chemically treated cellulose fiber.

24. The cementitious material of claim 23, wherein the cementitious material contains from about 0.2 $kg/m^3$ to about 20 $kg/m^3$ of the chemically treated cellulose fiber.

25. The cementitious material of claim 24, wherein the cementitious material contains from about 0.2 $kg/m^3$ to about 10 $kg/m^3$ of the chemically treated cellulose fiber.

26. The cementitious material of claim 1, wherein the chemically treated cellulose fiber is present in the form of a reinforcement mixture comprising one or more other reinforcement materials or additives.

27. The cementitious material of claim 26, wherein the reinforcement mixture contains chemically treated cellulose fibers and one or more fibers selected from the group consisting of thermoplastic fibers, polyolefin fibers, polyethylene fibers, polyester fibers nylon fibers, polyamide fibers, polyacrylonitrile fibers, polyacrylamide fibers, viscose fibers, PVC fibers, PVA fibers, metal fibers, carbon fibers, ceramic fibers, steel fibers, glass fibers, carbon fibers, natural organic and mineral fibers, abaca, asbestos, bamboo, coconut, cotton, jute, sisal, wood, rockwool, polypropylene fibers, kevlar, and rayon.

28. The cementitious material of claim 1, wherein the material contains a latex or a mixture of lattices.

29. The cementitious material of claim 1, where the chemically treated cellulose fibers have a Molecular Weight Stability Ratio (MWSR) of about 0.82 or greater.

30. The cementitious material of claim 1, wherein the chemically treated cellulose fiber remains discrete with its integrity intact.

31. The cementitious material of claim 1, wherein the chemically treated cellulose fiber has been derived from one or more sources selected from the group consisting of Southern Softwood Kraft, Northern Softwood Kraft, hardwood, eucalyptus, mechanical, recycle and rayon.

32. The cementitious material of claim 31, wherein the chemically treated cellulose fiber has been derived from a source selected from the group consisting of Southern Softwood Kraft, Northern Softwood Kraft, and a mixture thereof.

33. The cementitious material of claim 32, wherein the chemically treated cellulose fiber has been derived from Southern Softwood Kraft.

34. The cementitious material of claim 1, wherein the chemically treated cellulose fiber is made from cellulose fibers that have been bleached to reduce the content of lignin.

35. The cementitious material of claim 1, wherein the chemically treated cellulose fiber has a $TFASI_{(V)}$ of about 1.05 or greater.

36. The cementitious material of claim 35, wherein the chemically treated cellulose fiber has a $TFASI_{(V)}$ of about 1.1 or greater.

37. The cementitious material of claim 36, wherein the chemically treated cellulose fiber has a $TFASI_{(V)}$ of about 1.15 or greater.

38. A non-cellulosic fiber reinforced cementitious material comprising (A) cement, (B) optionally, sand, aggregate, or sand and aggregate, and (C) chemically treated non-cellulose fibers having a polyvalent cation content of from about 0.1 weight percent to about 5.0 weight percent based on the dry weight of the treated fibers, and having a weak acid content of from about 0.5 weight percent to about 10 weight percent based on the dry weight of the treated fibers.

39. The cementitious material of claim 38, where the chemically treated non-cellulosic fibers have a Molecular Weight Stability Ratio (MWSR) of about 0.85 or greater.

40. The cementitious material of claim 38, wherein the chemically treated non-cellulosic fiber has a $TFASI_{(V)}$ of about 1.05 or greater.

41. The cementitious material of claim 38, wherein the chemically treated non-cellulosic fiber has been treated with from about 1 weight percent to about 15 weight percent of a polyvalent metal-containing compound, based on the dry weight of the untreated fiber.

42. The cementitious material of claim 38, wherein the chemically treated non-cellulosic fiber has been treated with from about 0.5 weight percent to about 10 weight percent of an acid.

43. The cementitious material of claim 38, wherein the chemically treated non-cellulosic fiber content of the cementitious material is from about 0.01 weight percent to about 20 weight percent based on the weight of the cementitious material.

44. The cementitious material of claim 38, wherein the cementitious material contains from about 0.1 $kg/m^3$ to about 30 $kg/m^3$ of the chemically treated non-cellulosic fiber.

45. The cementitious material of claim 38, wherein the chemically treated non-cellulosic fiber is present in the form of a reinforcement mixture comprising one or more other reinforcement materials or additives.

46. The cementitious material of claim 38, wherein the material contains a latex or a mixture of lattices.

47. The cementitious material of claim 38, wherein the chemically treated non-cellulosic fiber remains discrete with its integrity intact.

48. The cementitious material of claim 38, wherein the chemically treated non-cellulosic fiber has an increase in ZSSR relative to that of the same fiber without chemical treatment of about 5 percent or greater.

49. A poured concrete structure containing the cementitious mixture of claim 1 or the cementitious mixture of claim 38.

50. The poured concrete structure of claim 49, wherein the concrete has a freeze/thaw durability factor as measured by ASTM C 666 of about 37 percent or greater.

51. A process for the preparation of a cementitious material comprising mixing together materials which include:

(A) cement, (B) optionally, sand, aggregate, or sand and aggregate, and (C) chemically treated cellulose or non-cellulose fibers having a polyvalent cation content of from about 0.1 weight percent to about 5.0 weight percent based on the dry weight of the treated fibers, and having a weak acid content of from about 0.5 weight percent to about 10 weight percent based on the dry weight of the treated fibers.

52. The process of claim 51, wherein the chemically treated fibers have been individualized prior to mixing.

53. The process of claim 51, wherein the chemically treated fibers are in the form of a sheet which has been diced or shredded prior to mixing.

54. The process of claim 51, wherein the chemically treated fibers are in the form of a sheet which has been diced prior to mixing.

55. The process of claim 51, wherein the chemically treated fibers are in an aqueous slurry prior to mixing.

56. The cementitious material produced by the process of claim 51.

57. A cellulose fiber reinforced cementitious material comprising (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and the chemically treated cellulose fibers have a Molecular Weight Stability Ratio (MWSR) of about 0.82 or greater.

58. The cementitious material of claim 57, where the chemically treated cellulose fibers have a Molecular Weight Stability Ratio (MWSR) of about 0.85 or greater.

59. The cementitious material of claim 58, where the chemically treated cellulose fibers have a Molecular Weight Stability Ratio (MWSR) of about 0.90 or greater.

60. The cementitious material of claim 59, where the chemically treated cellulose fibers have a Molecular Weight Stability Ratio (M-WSR) of about 0.95 or greater.

61. The cementitious material of claim 60, where the chemically treated cellulose fibers have a Molecular Weight Stability Ratio (MWSR) of about 0.98 or greater.

62. The cementitious material of claim 57, wherein the chemically treated cellulose fiber has been treated with from about 1 weight percent to about 20 weight percent of a polyvalent metal-containing compound, based on the dry weight of the untreated fiber.

63. The cementitious material of claim 62, wherein the chemically treated cellulose fiber has been treated with from about 2 weight percent to about 12 weight percent of a polyvalent metal-containing compound, based on the dry weight of the untreated fiber.

64. The cementitious material of claim 57, wherein the chemically treated cellulose fiber has been treated with a polyvalent metal-containing compound in which the polyvalent metal is in the $3^+$ oxidation state.

65. The cementitious material of claim 57, wherein the chemically treated cellulose fiber has been treated with an aluminum-containing compound, an iron (III)-containing compound or a combination thereof.

66. The cementitious material of claim 65, wherein the chemically treated cellulose fiber has been treated with an aluminum-containing compound.

67. The cementitious material of claim 66, wherein the chemically treated cellulose fiber has been treated with aluminum sulfate.

68. The cementitious material of claim 57, wherein the chemically treated cellulose fiber has been treated with from about 0.5 weight percent to about 10 weight percent of an acid.

69. The cementitious material of claim 68, wherein the acid is a weak acid.

70. The cementitious material of claim 69, wherein the chemically treated cellulose fiber has been treated with citric acid, oxalic acid, malonic acid, lactic acid or a combination thereof.

71. The cementitious material of claim 70, wherein the chemically treated cellulose fiber has been treated with citric acid, oxalic acid or a combination thereof.

72. The cementitious material of claim 71, wherein the chemically treated cellulose fiber has been treated with citric acid.

73. The cementitious material of claim 72, wherein the chemically treated cellulose fiber has been treated with an aluminum-containing compound and citric acid.

74. The cementitious material of claim 57, wherein the polyvalent cation content of the chemically treated cellulose fiber is from about 0.1 weight percent to about 3.0 weight percent based on the dry weight of the treated fibers.

75. The cementitious material of claim 74, wherein the polyvalent cation content of the chemically treated cellulose fiber is from about 0.1 weight percent to about 1.5 weight percent based on the dry weight of the treated fibers.

76. The cementitious material of claim 75, wherein the polyvalent cation content of the chemically treated cellulose fiber is from about 0.2 weight percent to about 0.9 weight percent based on the dry weight of the treated fibers.

77. The cementitious material of claim 57, wherein the chemically treated cellulose fiber content of the cementitious material is from about 0.01 weight percent to about 20 weight percent based on the weight of the cementitious material.

78. The cementitious material of claim 77, wherein the chemically treated cellulose fiber content of the cementitious material is from about 0.01 weight percent to about 10 weight percent based on the weight of the cementitious material.

79. The cementitious material of claim 78, wherein the chemically treated cellulose fiber content of the cementitious material is from about 0.01 weight percent to about 3 weight percent based on the weight of the cementitious material.

80. The cementitious material of claim 79, wherein the chemically treated cellulose fiber content of the cementitious material is from about 0.01 weight percent to about 1 weight percent based on the weight of the cementitious material.

81. The cementitious material of claim 80, wherein the chemically treated cellulose fiber content of the cementitious material is from about 0.01 weight percent to about 0.5 weight percent based on the weight of the cementitious material.

82. The cementitious material of claim 81, wherein the chemically treated cellulose fiber content of the cementitious material is from about 0.01 weight percent to about 0.1 weight percent based on the weight of the cementitious material.

83. The cementitious material of claim 57, wherein the cementitious material contains from about 0.1 $kg/m^3$ to about 30 $kg/m^3$ of the chemically treated cellulose fiber.

84. The cementitious material of claim 83, wherein the cementitious material contains from about 0.2 $kg/m^3$ to about 20 $kg/m^3$ of the chemically treated cellulose fiber.

85. The cementitious material of claim 84, wherein the cementitious material contains from about 0.2 $kg/m^3$ to about 10 $kg/m^3$ of the chemically treated cellulose fiber.

86. The cementitious material of claim 57, wherein the chemically treated cellulose fiber is present in the form of a reinforcement mixture comprising one or more other reinforcement materials or additives.

87. The cementitious material of claim 86, wherein the reinforcement mixture contains chemically treated cellulose fibers and one or more fibers selected from the group consisting of thermoplastic fibers, polyolefin fibers, polyethylene fibers, polyester fibers nylon fibers, polyamide fibers, polyacrylonitrile fibers, polyacrylamide fibers, viscose fibers, PVC fibers, PVA fibers, metal fibers, carbon fibers, ceramic fibers, steel fibers, glass fibers, carbon fibers, natural organic and mineral fibers, abaca, asbestos, bamboo, coconut, cotton, jute, sisal, wood, rockwool, polypropylene fibers, kevlar, and rayon.

88. The cementitious material of claim 57, wherein the material contains a latex or a mixture of lattices.

89. The cementitious material of claim 57, wherein the chemically treated cellulose fiber has a 24 hour ZSSR for NaOH treatment, as determined by a procedure based on TAPPI method T231 using 20 percent consistency for sealed bag testing of about 1.0 or greater.

90. The cementitious material of claim 57, wherein the chemically treated cellulose fiber remains discrete with its integrity intact.

91. The cementitious material of claim 57, wherein the chemically treated cellulose fiber has been derived from a source selected from the group consisting of one or more of Southern Softwood Kraft, Northern Softwood Kraft, hardwood, eucalyptus, mechanical, recycle and rayon.

92. The cementitious material of claim 91, wherein the chemically treated cellulose fiber has been derived from a source selected from the group consisting of Southern Softwood Kraft, Northern Softwood Kraft, and a mixture thereof.

93. The cementitious material of claim 92, wherein the chemically treated cellulose fiber has been derived from Southern Softwood Kraft.

94. The cementitious material of claim 57, wherein the chemically treated cellulose fiber is made from cellulose fibers that have been bleached to reduce the content of lignin.

95. The cementitious material of claim 57, wherein the chemically treated cellulose fiber has a $TFASI_{(V)}$ of about 1.05 or greater.

96. The cementitious material of claim 95, wherein the chemically treated cellulose fiber has a $TFASI_{(V)}$ of about 1.1 or greater.

97. The cementitious material of claim 96, wherein the chemically treated cellulose fiber has a $TFASI_{(V)}$ of about 1.15 or greater.

98. The cementitious material of claim 57, wherein the chemically treated cellulose fiber has an increase in ZSSR relative to that of the same fiber without chemical treatment of about 5 percent or greater.

99. The cementitious material of claim 57, wherein the chemically treated cellulose fiber has an increase in ZSSR relative to that of the same fiber without chemical treatment of about 10 percent or greater.

100. The cementitious material of claim 57, wherein the chemically treated cellulose fiber has an increase in ZSSR relative to that of the same fiber without chemical treatment of about 15 percent or greater.

101. The cementitious material of claim 57, wherein the chemically treated cellulose fiber has a WRV which is about 70 percent or greater of the WRV of the untreated fiber from which the treated fiber is produced.

102. A non-cellulosic fiber reinforced cementitious material comprising (A) cement, (B) optionally, sand, aggregate, or sand and aggregate, and (C) chemically treated non-cellulose fibers having a polyvalent cation content of from about 0.1 weight percent to about 5.0 weight percent based on the dry weight of the treated fibers, and the chemically treated non-cellulose fibers have a Molecular Weight Stability Ratio (MWSR) of about 0.82 or greater.

103. The cementitious material of claim 102, where the chemically treated non-cellulosic fibers have a Molecular Weight Stability Ratio (MWSR) of about 0.85 or greater.

104. The cementitious material of claim 102, wherein the chemically treated non-cellulosic fiber has a $TFASI_{(V)}$ of about 1.05 or greater.

105. The cementitious material of claim 102, wherein the chemically treated non-cellulosic fiber has been treated with from about 1 weight percent to about 15 weight percent of a polyvalent metal-containing compound, based on the dry weight of the untreated fiber.

106. The cementitious material of claim 102, wherein the chemically treated non-cellulosic fiber has been treated with from about 0.5 weight percent to about 10 weight percent of an acid.

107. The cementitious material of claim 102, wherein the chemically treated non-cellulosic fiber content of the cementitious material is from about 0.01 weight percent to about 20 weight percent based on the weight of the cementitious material.

108. The cementitious material of claim 102, wherein the cementitious material contains from about 0.1 $kg/m^3$ to about 30 $kg/m^3$ of the chemically treated non-cellulosic fiber.

109. The cementitious material of claim 102, wherein the chemically treated non-cellulosic fiber is present in the form of a reinforcement mixture comprising one or more other reinforcement materials or additives.

110. The cementitious material of claim 102, wherein the material contains a latex or a mixture of lattices.

111. The cementitious material of claim 102, wherein the chemically treated non-cellulosic fiber remains discrete with its integrity intact.

112. The cementitious material of claim 102, wherein the chemically treated non-cellulosic fiber has an increase in ZSSR relative to that of the same fiber without chemical treatment of about 5 percent or greater.

113. A poured concrete structure containing the cementitious mixture of claim 57 or the cementitious mixture of claim 102.

114. The poured concrete structure of claim 113, wherein the concrete has a freeze/thaw durability factor as measured by ASTM C 666 of about 37 percent or greater.

115. A process for the preparation of a cementitious material comprising mixing together materials which include:

(A) cement, (B) optionally, sand, aggregate, or sand and aggregate, and (C) chemically treated cellulose or non-cellulose fibers having a polyvalent cation content of from about 0.1 weight percent to about 5.0 weight percent based on the dry weight of the treated fibers, and the chemically treated cellulose fibers have a Molecular Weight Stability Ratio (MWSR) of about 0.82 or greater.

116. The process of claim 115, wherein the chemically treated fibers have been individualized prior to mixing.

117. The process of claim 115, wherein the chemically treated fibers are in the form of a sheet which has been diced or shredded prior to mixing.

118. The cementitious material produced by the process of claim 115.

119. A cellulose fiber reinforced cementitious material comprising (A) cement, (B) optionally, sand, aggregate, or sand and aggregate, and (C) chemically treated cellulose fibers having a polyvalent cation content of from about 0.1 weight percent to about 5.0 weight percent based on the dry weight of the treated fibers, and having a buffer salt content, a buffer salt weak acid combination content, an insoluble metal hydroxide content or an antioxidant content of from about 0.5 weight percent to about 10 weight percent based on the dry weight of the treated fibers.

* * * * *